(12) United States Patent
Bisaiji et al.

(10) Patent No.: US 8,763,370 B2
(45) Date of Patent: Jul. 1, 2014

(54) EXHAUST PURIFICATION SYSTEM OF INTERNAL COMBUSTION ENGINE

(75) Inventors: Yuki Bisaiji, Mishima (JP); Kohei Yoshida, Gotemba (JP); Mikio Inoue, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/255,786

(22) PCT Filed: Mar. 23, 2010

(86) PCT No.: PCT/JP2010/055487
§ 371 (c)(1),
(2), (4) Date: Sep. 22, 2011

(87) PCT Pub. No.: WO2011/118044
PCT Pub. Date: Sep. 29, 2011

(65) Prior Publication Data
US 2013/0000284 A1   Jan. 3, 2013

(51) Int. Cl.
*F01N 3/00* (2006.01)
*F01N 3/10* (2006.01)

(52) U.S. Cl.
USPC ............... 60/286; 60/285; 60/301; 60/303

(58) Field of Classification Search
USPC ................ 60/285, 286, 299, 301, 303
See application file for complete search history.

(56) References Cited

U.S. PATENT DOCUMENTS

| | | | |
|---|---|---|---|
| 2003/0101713 A1 | 6/2003 | Dalla Betta et al. | |
| 2004/0050037 A1 | 3/2004 | Betta et al. | |
| 2004/0168431 A1* | 9/2004 | Goralski et al. | 60/286 |
| 2008/0053073 A1* | 3/2008 | Kalyanaraman et al. | 60/286 |
| 2009/0000277 A1* | 1/2009 | Yoshida et al. | 60/286 |
| 2010/0242459 A1* | 9/2010 | Tsujimoto et al. | 60/320 |

FOREIGN PATENT DOCUMENTS

| | | | |
|---|---|---|---|
| JP | A-2000-145434 | 5/2000 | |
| JP | A-2004-316458 | 11/2004 | |
| JP | A-2005-113801 | 4/2005 | |
| JP | A-2007-514090 | 5/2007 | |
| JP | B-3969450 | 6/2007 | |
| JP | A-2009-168031 | 7/2009 | |
| WO | WO 2009082035 A1 * | 7/2009 | .......... F01N 3/20 |

OTHER PUBLICATIONS

U.S. Appl. No. 13/582,862, filed Sep. 5, 2012, in the name of Uenishi et al.

(Continued)

*Primary Examiner* — Audrey K Bradley
(74) *Attorney, Agent, or Firm* — Oliff PLC

(57) ABSTRACT

Inside of an engine exhaust passage, a hydrocarbon feed valve (15) and an exhaust purification catalyst (13) are arranged. At the time of engine operation, a first $NO_x$ purification method which maintains the air-fuel ratio of the exhaust gas flowing into the exhaust purification catalyst (13) lean while injecting hydrocarbons from the hydrocarbon feed valve (15) at predetermined feed intervals to thereby remove the $NO_x$ which is contained in exhaust gas and a second $NO_x$ purification method which switches the air-fuel ratio of the exhaust gas flowing to the exhaust purification catalyst (13) from lean to rich by intervals longer than the above predetermined feed intervals to thereby remove the $NO_x$ are selectively used in accordance with the sulfur poisoning of the exhaust purification catalyst (13).

12 Claims, 15 Drawing Sheets

(56) References Cited

OTHER PUBLICATIONS

U.S. Appl. No. 13/259,712 in the name of Bisaiji et al., filed Oct. 3, 2011.

U.S. Appl. No. 13/499,331 in the name of Bisaiji, filed Mar. 30, 2012.

International Search Report issued in International Patent Application No. PCT/JP2010/055487 dated Jun. 22, 2010.

U.S. Appl. No. 13/264,594, filed Oct. 14, 2011 in the name of Mikio Inoue et al.

U.S. Appl. No. 13/375,674, filed Dec. 1, 2011 in the name of Mikio Inoue et al.

\* cited by examiner

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges, in an engine exhaust passage, an $NO_x$ storage catalyst which stores $NO_x$ which is contained in exhaust gas when the air-fuel ratio of the inflowing exhaust gas is lean and which releases the stored $NO_x$ when the air-fuel ratio of the inflowing exhaust gas becomes rich, which arranges, in the engine exhaust passage upstream of the $NO_x$ storage catalyst, an oxidation catalyst which has an adsorption function, and which feeds hydrocarbons into the engine exhaust passage upstream of the oxidation catalyst to make the air-fuel ratio of the exhaust gas flowing into the $NO_x$ storage catalyst rich when releasing $NO_x$ from the $NO_x$ storage catalyst (for example, see Patent Literature 1).

In this internal combustion engine, the hydrocarbons which are fed when releasing $NO_x$ from the $NO_x$ storage catalyst are made gaseous hydrocarbons at the oxidation catalyst, and the gaseous hydrocarbons are fed to the $NO_x$ storage catalyst. As a result, the $NO_x$ which is released from the $NO_x$ storage catalyst is reduced well.

CITATION LIST

Patent Literature

Patent Literature 1: Japanese Patent No. 3969450

SUMMARY OF INVENTION

Technical Problem

In this regard, fuel and lubricants contain sulfur. Therefore, the exhaust gas contains $SO_x$. This $SO_x$ is stored together with the $NO_x$ in the $NO_x$ storage catalyst. In this regard, this $SO_x$ is not released from the $NO_x$ storage catalyst by just the air-fuel ratio of the exhaust gas being made rich. Therefore, the amount of $SO_x$ which is stored in the $NO_x$ storage catalyst gradually increases. As a result, the $NO_x$ amount which can be stored gradually decreases, so the $NO_x$ purification rate gradually decreases.

However, recently, a new $NO_x$ purification method enabling $NO_x$ to be removed by a high purification rate when the $SO_x$ storage amount increases was discovered by the inventors. Therefore, if using this new $NO_x$ purification method when the $SO_x$ storage amount increases, it is possible to remove $NO_x$ by a high $NO_x$ purification rate regardless of the $SO_x$ storage amount.

An object of the present invention is to provide an exhaust purification system of an internal combustion engine which enables a high $NO_x$ purification rate to be obtained regardless of the $SO_x$ storage amount.

Solution to Problem

According to the present invention, there is provided an exhaust purification system of an internal combustion engine wherein an exhaust purification catalyst for reacting $NO_x$ contained in exhaust gas and reformed hydrocarbons is arranged is an engine exhaust passage, precious metal catalysts are carried and a basic layer is formed on the exhaust purification catalyst, the exhaust purification catalyst has a property of storing $NO_x$ which is contained in exhaust gas when an air-fuel ratio of an exhaust gas flowing into the exhaust purification catalyst is lean and releasing stored $NO_x$ when the air-fuel ratio of the inflowing exhaust gas becomes rich and has a property of reducing the $NO_x$ which is contained in exhaust gas if making a concentration of hydrocarbons flowing into the exhaust purification catalyst vibrate within a predetermined range of amplitude and within a predetermined range of period when a sulfur poisoning of the exhaust purification catalyst increases, and, at the time of engine operation, a first $NO_x$ purification method which makes the concentration of hydrocarbons flowing into the exhaust purification catalyst vibrate by within the predetermined range of amplitude and within the predetermined range of period to thereby remove the $NO_x$ which is contained in exhaust gas and a second $NO_x$ purification method which switches the air-fuel ratio of the exhaust gas flowing into the exhaust purification catalyst from lean to rich by a period longer than the above predetermined range of period to thereby remove the $NO_x$ are selectively used in accordance with the sulfur poisoning of the exhaust purification catalyst.

Advantageous Effects of Invention

By selectively using the first $NO_x$ purification method and the second $NO_x$ purification method, it is possible to obtain a high $NO_x$ purification rate regardless of the sulfur poisoning of the exhaust purification catalyst.

DESCRIPTION OF EMBODIMENTS

Figure 1:
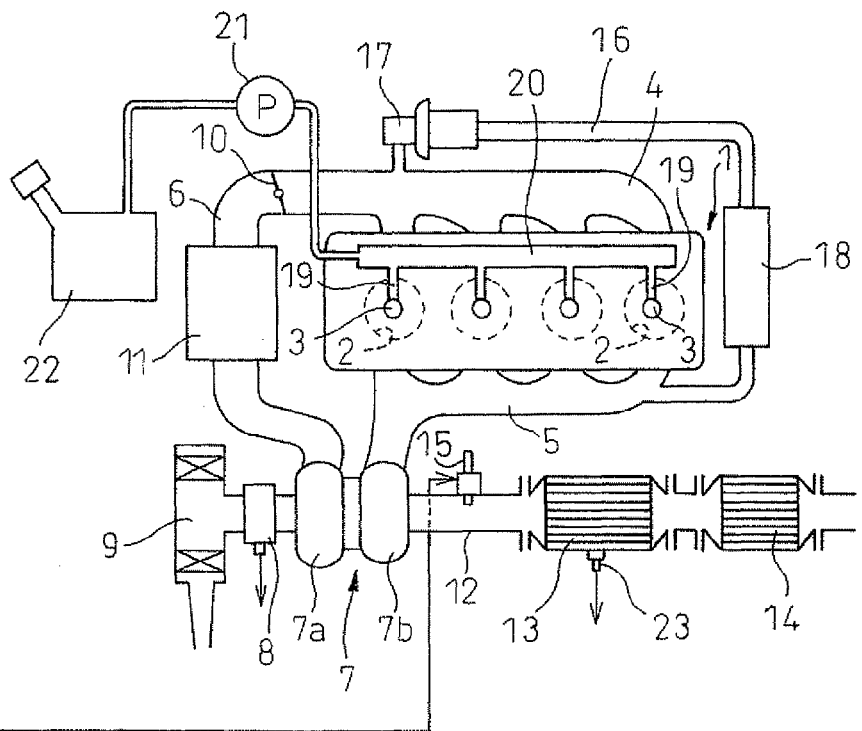
FIG. 1 is an overall view of a compression ignition type internal combustion engine.
Figure 1:
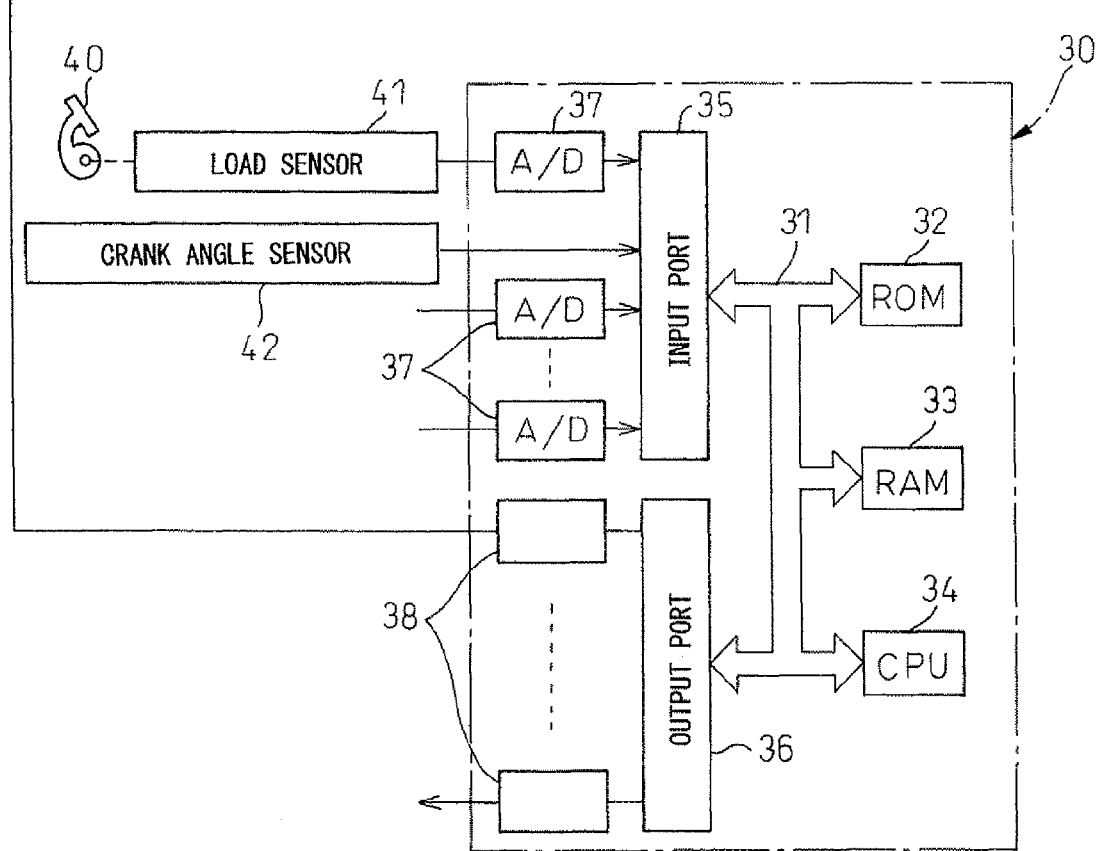

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, as shown in FIG. 1, the exhaust manifold 5 is connected to an inlet of an exhaust turbine 7b of an exhaust turbocharger. The outlet of the exhaust turbine 7b is connected through an exhaust pipe 12 to an inlet of the exhaust purification catalyst 13, while the outlet of the exhaust purification catalyst 13 is connected to a particulate filter 14 for trapping particulate which is contained in the exhaust gas. Inside the exhaust pipe 12 upstream of the exhaust purification catalyst 13, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, around the EGR passage 16, a cooling device 18 is arranged for cooling EGR gas flowing through the inside of the EGR passage 16. In the embodiment shown in FIG. 1, the engine cooling water is guided to the inside of the cooling device 18 where the engine cooling water is used to cool the EGR gas. On the other hand, each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 20 is fed through each fuel feed tube 19 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. At the exhaust purification catalyst 13, a temperature sensor 23 for detecting the temperature of the exhaust purification catalyst 13 is attached. The output signals of this temperature sensor 23 and intake air amount detector 8 are input through respectively corresponding AD converters 37 to the input port 35. Further, the accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, a step motor for driving the throttle valve 10, hydrocarbon feed valve 15, EGR control valve 17, and fuel pump 21.

Figure 2:
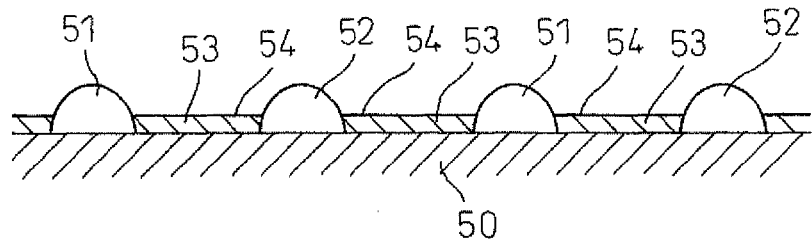
FIG. 2 is a view schematically showing a surface part of a catalyst carrier.

FIG. 2 schematically shows a surface part of a catalyst carrier which is carried on a substrate of the exhaust purification catalyst 13. At this exhaust purification catalyst 13, as shown in FIG. 2, for example, there is provided a catalyst carrier 50 made of alumina on which precious metal catalysts 51 and 52 are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal able to donate electrons to $NO_x$. The exhaust gas flows along the top of the catalyst carrier 50, so the precious metal catalysts 51 and 52 can be said to be carried on the exhaust gas flow surface of the exhaust purification catalyst 13. Further, the surface of the basic layer 53 exhibits basicity, so the surface of the basic layer 53 is called the basic exhaust gas flow surface part 54.

In FIG. 2, the precious metal catalyst 51 is comprised of platinum Pt, while the precious metal catalyst 52 is comprised of rhodium Rh. That is, the precious metal catalysts 51 and 52 which are carried on the catalyst carrier 50 are comprised of platinum Pt and rhodium Rh. Note that, on the catalyst carrier 50 of the exhaust purification catalyst 13, in addition to platinum Pt and rhodium Rh, palladium Pd may be further carried or, instead of rhodium Rh, palladium Pd may be carried. That is, the precious metal catalysts 51 and 52 which are carried on the catalyst carrier 50 are comprised of platinum Pt and at least one of rhodium Rh and palladium Pd.

Now, if the ratio of the air and fuel (hydrocarbons) which are fed into the engine intake passage, combustion chambers 2, and exhaust passage upstream of the exhaust purification catalyst 13 is called the air-fuel ratio of the exhaust gas, the basic layer 53 absorbs the $NO_x$ when the air-fuel ratio of the exhaust gas is lean and releases the absorbed $NO_x$ when the oxygen concentration in the exhaust gas falls, i.e., performs an $NO_x$ absorption and release action. Note that, the basic layer 53 sometimes adsorbs $NO_x$ when the air-fuel ratio of the exhaust gas is lean. Therefore, if using the term of storage as a term including both absorption and adsorption, the basic layer 53 stores the $NO_x$ when the air-fuel ratio of the exhaust gas is lean and releases the stored $NO_x$ when the oxygen concentration in the exhaust gas falls, i.e., performs an $NO_x$ storage and release action.

Figure 3A:
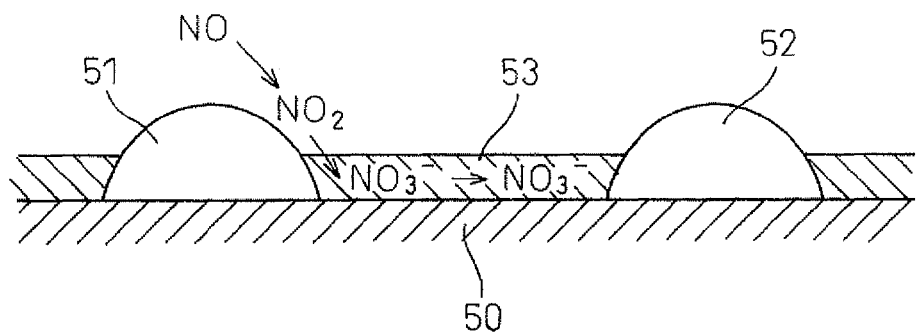
FIGS. 3A and 3B are views for explaining an oxidation reduction reaction in an exhaust purification catalyst.

That is, explaining this taking as an example the case of using barium Ba as the ingredient forming the basic layer 53, when the air-fuel ratio of the exhaust gas is lean, that is, when the oxygen concentration in the exhaust gas is high, the $NO_x$ which is contained in the exhaust gas, as shown in FIG. 3A, is oxidized on the platinum Pt 51 and becomes $NO_2$. Next, this is stored in the basic layer 53 and bonds with the barium carbonate $BaCO_3$ while diffusing inside the basic layer 53 in the form of nitrate ions $NO_3^-$. In this way, the $NO_x$ is stored in the basic layer 53. So long as the oxygen concentration in the exhaust gas is high, $NO_2$ is formed on the surface of the platinum Pt 51. So long as the $NO_x$ storage ability of the basic layer 53 does not become saturated, the $NO_2$ is stored in the basic layer 53 and nitrate ions $NO_3^-$ are produced.

Figure 3B:
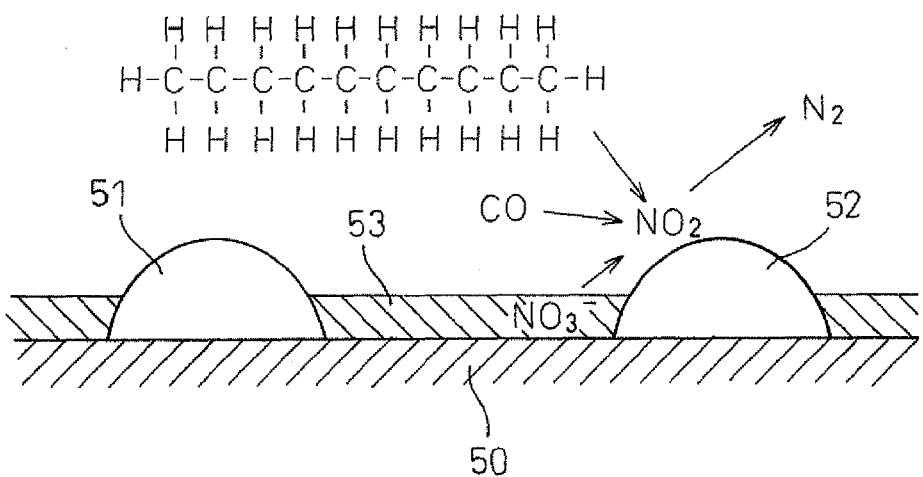

As opposed to this, if the air-fuel ratio of the exhaust gas flowing into the exhaust purification catalyst 13 is made the stoichiometric air-fuel ratio or rich, the oxygen concentration in the exhaust gas falls, so the reaction proceeds in the opposite direction ($NO_3^- \rightarrow NO_2$) and therefore the nitrates stored in the basic layer 53 gradually becomes nitrate ions $NO_3^-$ and, as shown in FIG. 3B, are released from the basic layer 53 in the form of $NO_2$. Next, the released $NO_2$ is reduced by the hydrocarbons HC and CO contained in the exhaust gas.

In this way, when combustion is performed when the air-fuel ratio of the exhaust gas is lean, that is, under a lean air-fuel ratio, the $NO_x$ in the exhaust gas is stored in the basic layer 53. However, if combustion is continued under a lean air-fuel ratio, eventually, the $NO_x$ storage ability of the basic layer 53 will end up becoming saturated and therefore the basic layer 53 will no longer be able to store the $NO_x$. Therefore, in this embodiment according to the present invention, before the storage ability of the basic layer 53 becomes saturated, the air-fuel ratio of the exhaust gas is temporarily made rich and thereby the basic layer 53 is made to release the $NO_x$.

Figure 4:
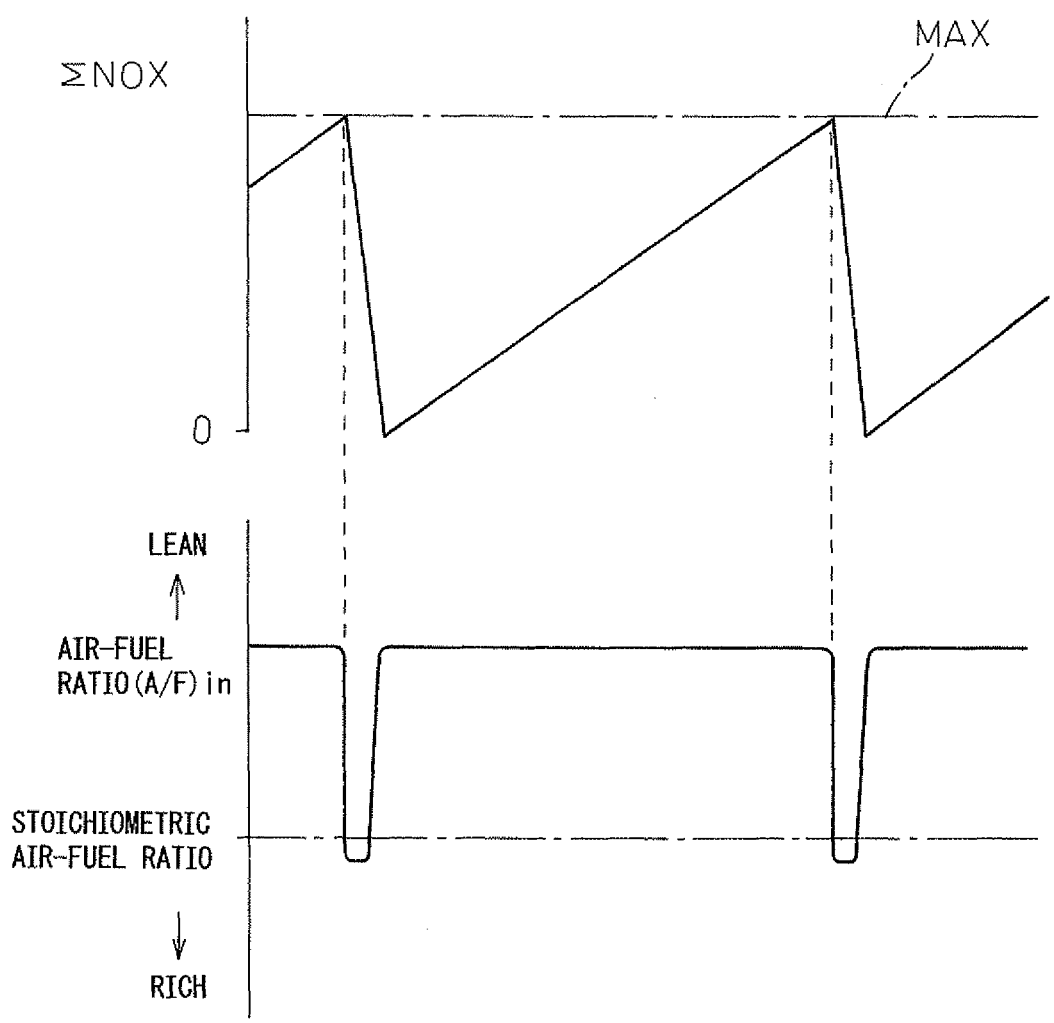
FIG. 4 is a view showing a change in the air-fuel ratio of exhaust gas flowing to an exhaust purification catalyst etc.

FIG. 4 shows the control for release of $NO_x$ from this basic layer 53. That is, in this embodiment according to the present invention, as shown in FIG. 4, when the stored $NO_x$ amount $\Sigma NOX$ stored in the basic layer 53 exceeds a predetermined allowable amount MAX, the air-fuel ratio (A/F)in of the exhaust gas flowing into the exhaust purification catalyst 13 is temporarily made rich. If the air-fuel ratio (A/F)in of the exhaust gas is made rich, the $NO_x$ which was stored in the basic layer 53 when the air-fuel ratio (A/F)in of the exhaust gas was lean is released from the basic layer 53 all at once and reduced. Due to this, the $NO_x$ is removed.

Figure 5:
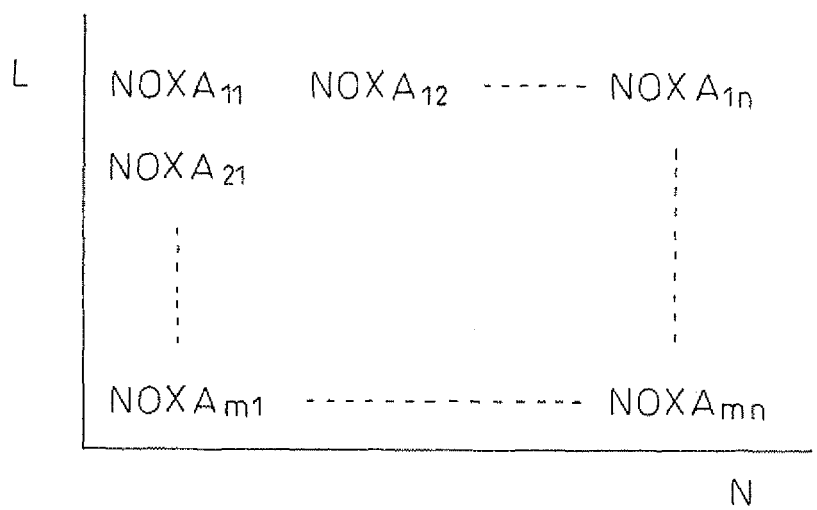
FIG. 5 is a view showing a map of an exhausted $NO_x$ amount NOXA.

The stored $NO_x$ amount $\Sigma NOX$ is, for example, calculated from the amount of $NO_x$ which is exhausted from the engine. In this embodiment according to the present invention, the $NO_x$ amount NOXA which is exhausted from the engine per unit time is stored as a function of the engine load L and the engine speed N in the form of a map such as shown in FIG. 5 in advance in the ROM 32. From this exhausted $NO_x$ amount NOXA, the stored $NO_x$ amount $\Sigma NOX$ is calculated. The period by which the air-fuel ratio (A/F)in of the exhaust gas is made rich is usually 1 minute or more.

In this $NO_x$ purification method, when the air-fuel ratio (A/F)in of the exhaust gas is lean, the $NO_x$ which is contained in exhaust gas is stored in the basic layer 53. Therefore, the basic layer 53 performs the role as a storage agent for temporarily storing the $NO_x$. That is, in this $NO_x$ purification method, the exhaust purification catalyst 13 functions as an $NO_x$ storage catalyst which stores the $NO_x$ when the air-fuel ratio of the exhaust gas is lean and releases the stored $NO_x$ when the oxygen concentration in the exhaust gas falls.

Figure 6:
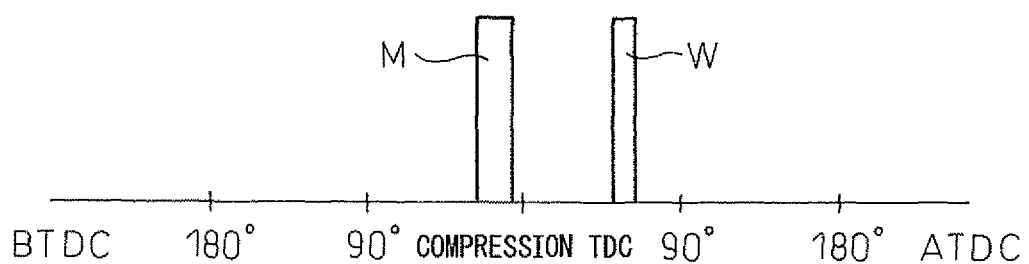
FIG. 6 is a view showing a fuel injection timing.

Further, in this $NO_x$ purification method, as shown in FIG. 6, additional fuel W is injected in addition to the combustion use fuel M into the combustion chambers 2 from the fuel injectors 3 so as to make the air-fuel ratio (A/F)in of the exhaust gas flowing into the exhaust purification catalyst 13 rich. Note that, the abscissa of FIG. 6 shows the crank angle. This additional fuel W is injected at a timing where it is burned, but does not appear as engine output, that is, slightly before ATDC90° after compression top dead center. Of course, it is also possible to make the feed amount of hydrocarbons from the hydrocarbon feed valve 15 increase so as to make the air-fuel ratio (A/F)in of the exhaust gas rich.

Figure 7:
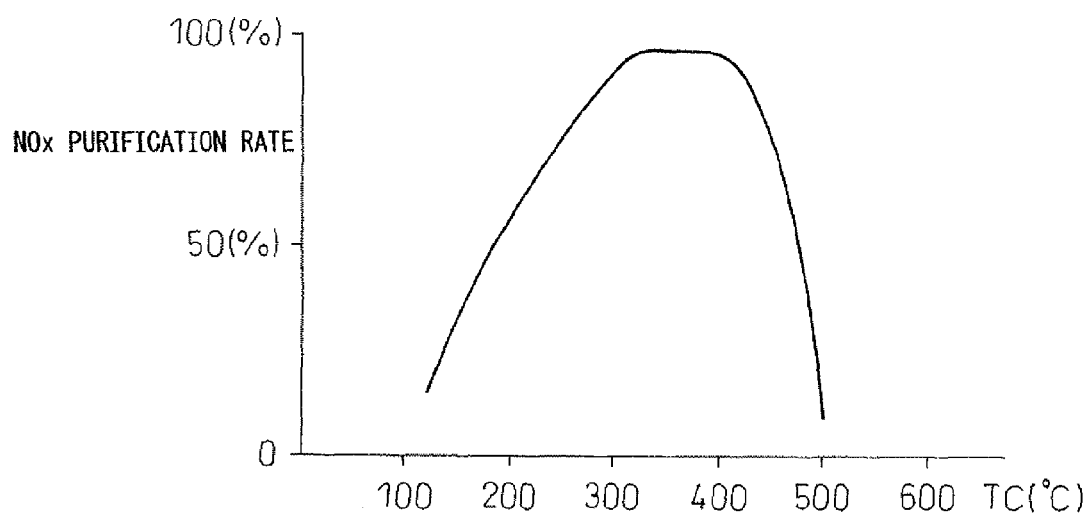
FIG. 7 is a view showing an $NO_x$ purification rate.

FIG. 7 shows the $NO_x$ purification rate when making the exhaust purification catalyst 13 function as an $NO_x$ storage catalyst in this way. Note that, the abscissa of the FIG. 7 shows the catalyst temperature TC of the exhaust purification catalyst 13. When making the exhaust purification catalyst 13 function as an $NO_x$ storage catalyst, as shown in FIG. 7, when the catalyst temperature TC is 300° C. to 400° C., an extremely high $NO_x$ purification rate is obtained, but when the catalyst temperature TC becomes a 400° C. or higher high temperature, the $NO_x$ purification rate falls.

Figure 8:
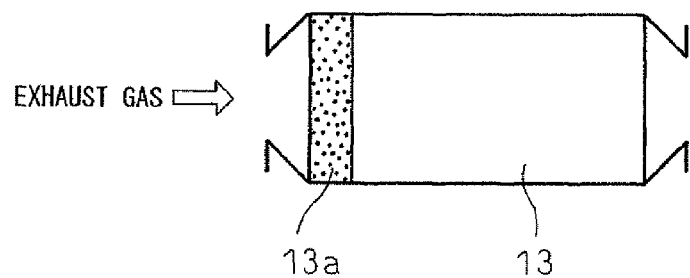
FIG. 8 is a view for explaining $SO_x$ poisoning.

In this regard, exhaust gas contains $SO_x$, that is, $SO_2$. If this $SO_2$ flows into the exhaust purification catalyst 13, this $SO_2$ is oxidized on the platinum Pt 51 and becomes $SO_3$. Next, this $SO_3$ is stored in the basic layer 53 and bonds with the barium carbonate $BaCO_3$ while diffusing inside the basic layer 53 in the form of sulfate ions $SO_4^{2-}$ to thereby produce the stable sulfate $BaSO_4$. This sulfate $BaSO_4$ is produced in the region where the exhaust gas first contacts the exhaust purification catalyst 13, that is, in FIG. 8, the upstream side end region of the exhaust purification catalyst 13 shown by 13a.

In this regard, the basic layer 53 has a strong basicity, so the sulfate $BaSO_4$ is stable and hard to break down. If just making the air-fuel ratio of the exhaust gas rich, the sulfate $BaSO_4$ will remain as it is without being broken down. Therefore, inside the basic layer 53, along with the elapse of time, the sulfate $BaSO_4$ will increase, therefore, along with the elapse of time, the amount of $NO_x$ which the basic layer 53 can store will fall. As a result, as shown by the solid line in FIG. 9, the greater the $SO_x$ amount $\Sigma SOX$ which is stored in the basic layer 53, that is, the greater the sulfur poisoning of the exhaust purification catalyst 13, the more the $NO_x$ purification rate of the exhaust purification catalyst 13 will fall.

In this regard, if sulfates are formed in the basic layer 53, the basicity of the basic layer 53 will weaken and, as a result, the oxidizing function on the hydrocarbons HC by the precious metal, for example, platinum Pt 51, will be enhanced. That is, in this embodiment according to the present invention, the action of oxidizing the hydrocarbons HC at the upstream side end region 13a of the exhaust purification catalyst 13 is enhanced. As a result, for example, when injecting hydrocarbons from the hydrocarbon feed valve 15, the injected hydrocarbons can be reformed at the upstream side end region 13a of the exhaust purification catalyst 13.

Figure 10:
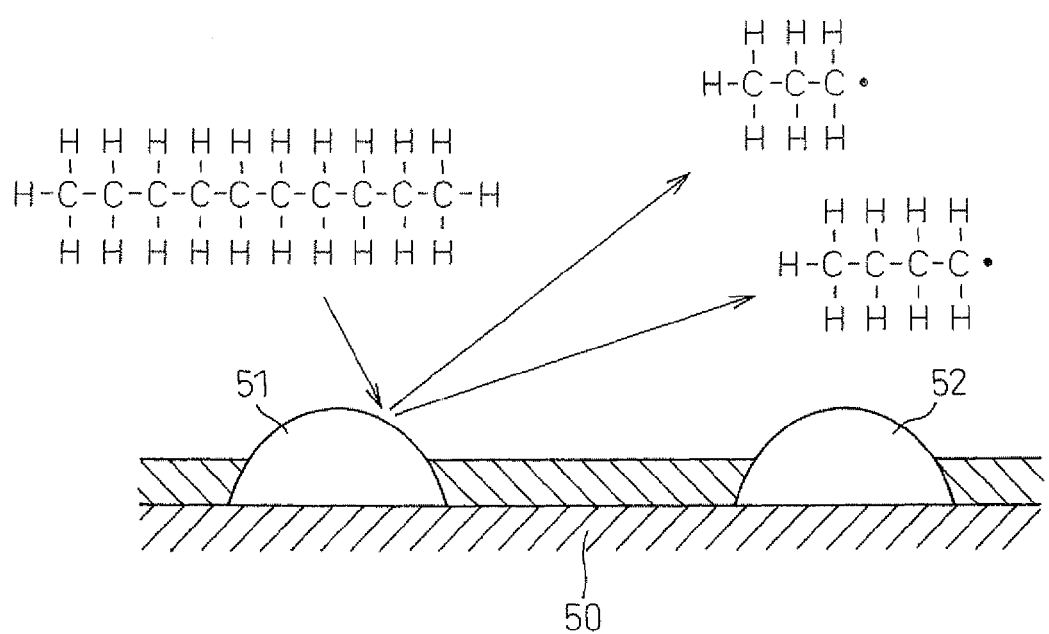
FIG. 10 is a view for explaining an oxidation reaction in an exhaust purification catalyst.

FIG. 10 illustrates the reforming action performed at the upstream side end region 13a of the exhaust purification catalyst 13 at this time. As shown in FIG. 10, at this time, the hydrocarbons HC injected from the hydrocarbon feed valve 15 become radical hydrocarbons HC with a small carbon number due to the platinum Pt 51.

Note that, even if injecting fuel, that is, hydrocarbons, from the fuel injector 3 into the combustion chamber 2 during the latter half of the expansion stroke or during the exhaust stroke, the hydrocarbons are reformed inside of the combustion chamber 2 or at the exhaust purification catalyst 13, and the $NO_x$ which is contained in the exhaust gas is removed by the modified hydrocarbons at the exhaust purification catalyst 13. Therefore, in the present invention, instead of feeding hydrocarbons from the hydrocarbon feed valve 15 to the inside of the engine exhaust passage, it is also possible to feed hydrocarbons into the combustion chamber 2 during the latter half of the expansion stroke or during the exhaust stroke. In this way, in the present invention, it is also possible to feed hydrocarbons to the inside of the combustion chamber 2, but below the present invention is explained taking as an example the case of injecting hydrocarbons from the hydrocarbon feed valve 15 to the inside of the engine exhaust passage.

In this regard, if it becomes possible to reform the hydrocarbons in this way, the new method discovered by the inventors could be used to remove the $NO_x$. Below, referring to FIG. 11 to FIG. 19, this new $NO_x$ purification method will be explained. Note that, the new $NO_x$ purification method explained below will be referred to as the first $NO_x$ purification method, while the $NO_x$ purification method using the $NO_x$ storage and release action already explained with reference to FIG. 3 to FIG. 7 will be referred to as the second $NO_x$ purification method.

Figure 11:
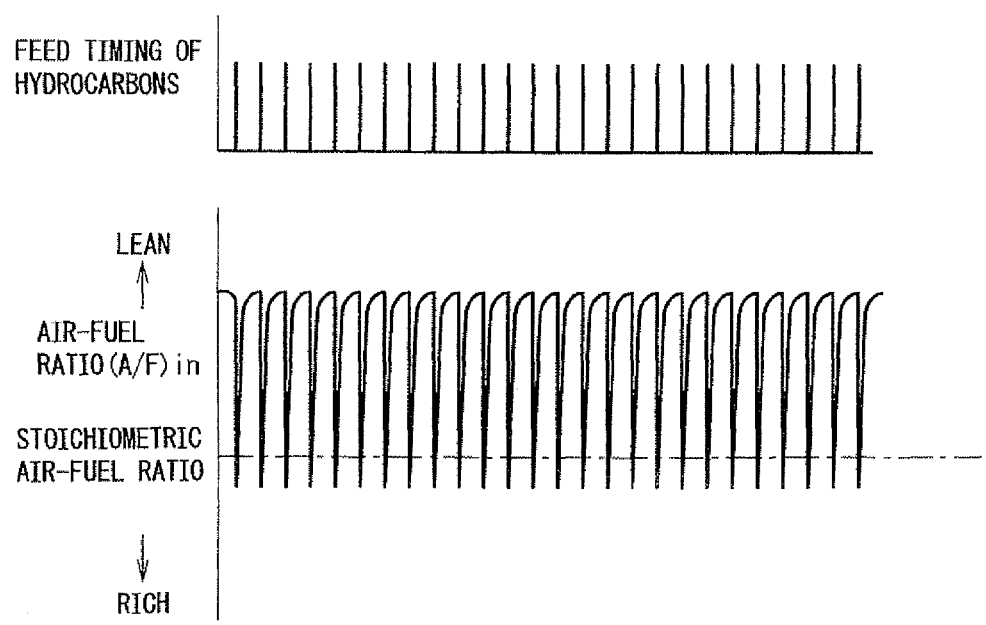
FIG. 11 is a view showing a change in an air-fuel ratio of exhaust gas flowing to an exhaust purification catalyst.

FIG. 11 shows the timing of feeding hydrocarbons from the hydrocarbon feed valve 15 and the changes in the air-fuel ratio (A/F)in of the exhaust gas flowing into the exhaust purification catalyst 13. Note that, the changes in the air-fuel ratio (A/F)in depend on the change in concentration of the hydrocarbons in the exhaust gas which flows into the exhaust purification catalyst 13, so it can be said that the change in the air-fuel ratio (A/F)in shown in FIG. 11 expresses the change in concentration of the hydrocarbons. However, if the hydrocarbon concentration becomes higher, the air-fuel ratio (A/F) in becomes smaller, so, in FIG. 11, the more to the rich side the air-fuel ratio (A/F)in becomes, the higher the hydrocarbon concentration.

Figure 12:
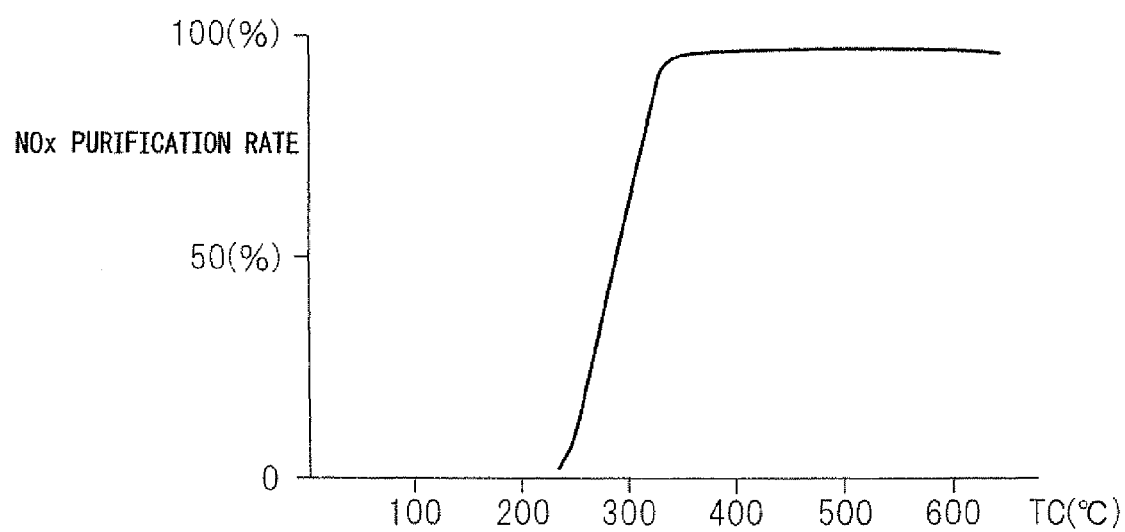
FIG. 12 is a view showing an $NO_x$ purification rate.

FIG. 12 shows the $NO_x$ purification rate by the exhaust purification catalyst 13 with respect to the catalyst temperatures of the exhaust purification catalyst 13 when periodically making the concentration of hydrocarbons flowing into the exhaust purification catalyst 13 change so as to, as shown in FIG. 11, make the air-fuel ratio (A/F)in of the exhaust gas flowing to the exhaust purification catalyst 13 change. The inventors engaged in research relating to $NO_x$ purification for a long time. In the process of research, they learned that if making the concentration of hydrocarbons flowing into the exhaust purification catalyst 13 vibrate by within a predetermined range of amplitude and within a predetermined range of period, as shown in FIG. 11, an extremely high $NO_x$ purification rate is obtained even in a 400° C. or higher high temperature region as shown in FIG. 12.

Figure 13A:
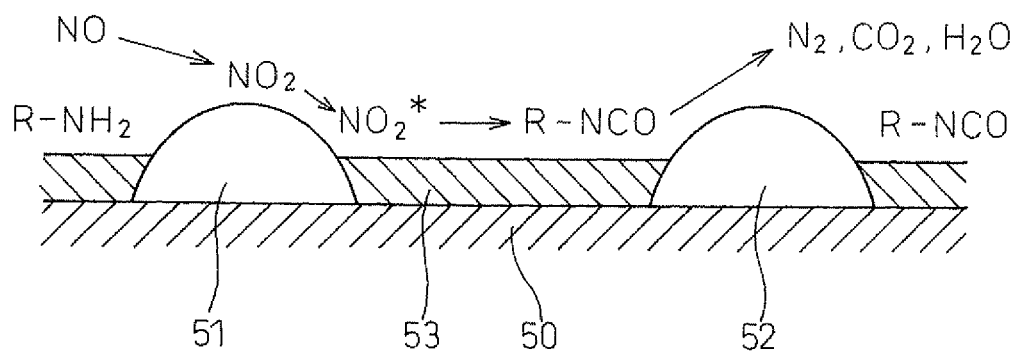
FIGS. 13A and 13B are views for explaining an oxidation reduction reaction in an exhaust purification catalyst.
Figure 13B:
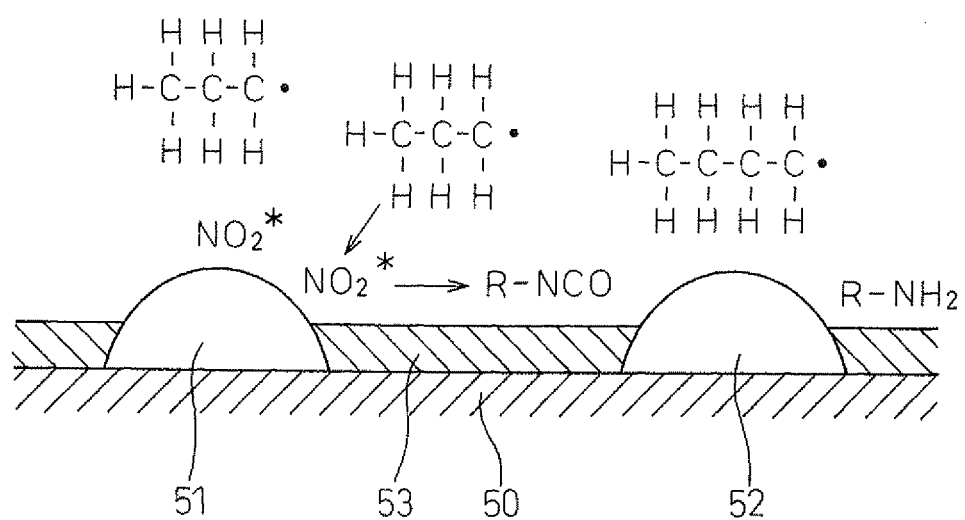

Furthermore, at this time, a large amount of reducing intermediate containing nitrogen and hydrocarbons continues to be held or adsorbed on the surface of the basic layer 53, that is, on the basic exhaust gas flow surface part 54 of the exhaust purification catalyst 13. It is learned that this reducing intermediate plays a central role in obtaining a high $NO_x$ purification rate. Next, this will be explained with reference to FIGS. 13A and 13B. Note that, these FIGS. 13A and 13B schematically show the surface part of the catalyst carrier 50 of the exhaust purification catalyst 13. These FIGS. 13A and 13B show the reaction which is presumed to occur when the concentration of hydrocarbons flowing into the exhaust purification catalyst 13 is made to vibrate by within a predetermined range of amplitude and within a predetermined range of period.

FIG. 13A shows when the concentration of hydrocarbons flowing into the exhaust purification catalyst 13 is low, while FIG. 13B shows when hydrocarbons are fed from the hydrocarbon feed valve 15 and the concentration of hydrocarbons flowing into the exhaust purification catalyst 13 becomes high.

Now, as will be understood from FIG. 11, the air-fuel ratio of the exhaust gas which flows into the exhaust purification catalyst 13 is maintained lean except for an instant, so the exhaust gas which flows into the exhaust purification catalyst 13 normally becomes a state of oxygen excess. Therefore, the $NO_x$ which is contained in the exhaust gas, as shown in FIG. 13A, is oxidized on the platinum 51 and becomes $NO_2$. Next, this $NO_2$ is supplied with electrons from the platinum 51 and becomes $NO_2^-$. Therefore, a large amount of $NO_2^-$ is produced on the platinum 51. This $NO_2^-$ is strong in activity. Above, this $NO_2^-$ is called the active $NO_2^*$.

On the other hand, if hydrocarbons are fed from the hydrocarbon feed valve 15, as shown in FIG. 10, the hydrocarbons are reformed and become radicalized inside of the exhaust purification catalyst 13. As a result, as shown in FIG. 13B, the hydrocarbon concentration around the active $NO_2^*$ becomes higher. In this regard, after the active $NO_2^*$ is produced, if the state of a high oxygen concentration around the active $NO_2^*$ continues for a predetermined time or more, the active $NO_2^*$ is oxidized and is absorbed in the basic layer 53 in the form of nitrate ions $NO_3^-$. However, if the hydrocarbon concentration around the active $NO_2^*$ is made higher before this predetermined time passes, as shown in FIG. 13B, the active $NO_2^*$ reacts on the platinum 51 with the radical hydrocarbons HC whereby a reducing intermediate is produced. This reducing intermediate is adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. However, in this case, what is hydrolyzed is considered to be part of the isocyanate compound R—NCO. Therefore, as shown in FIG. 13B, the majority of the reducing intermediate which is held or adsorbed on the surface of the basic layer 53 is believed to be the isocyanate compound R—NCO and amine compound R—$NH_2$.

On the other hand, as shown in FIG. 13B, if the produced reducing intermediate is surrounded by the hydrocarbons HC, the reducing intermediate is blocked by the hydrocarbons HC and the reaction will not proceed any further. In this case, the concentration of hydrocarbons flowing into the exhaust purification catalyst 13 is lowered and thereby the oxygen concentration becomes higher. If this happens, the hydrocarbons around the reducing intermediate will be oxidized. As a result, as shown in FIG. 13A, the reducing intermediate and the active $NO_2^*$ will react. At this time, the active $NO_2^*$ reacts with the reducing intermediate R—NCO or R—$NH_2$ to form $N_2$, $CO_2$, and $H_2O$ and consequently the $NO_x$ is removed.

In this way, in the exhaust purification catalyst 13, by making the concentration of hydrocarbons flowing into the exhaust purification catalyst 13 higher, a reducing intermediate is produced. By making the concentration of hydrocarbons flowing into the exhaust purification catalyst 13 lower and raising the oxygen concentration, the active $NO_2^*$ reacts with the reducing intermediate and the $NO_x$ is removed. That is, in order for the exhaust purification catalyst to remove the $NO_x$, the concentration of hydrocarbons flowing into the exhaust purification catalyst 13 has to be periodically changed.

Of course, in this case, it is necessary to raise the concentration of hydrocarbons to a concentration sufficiently high for producing the reducing intermediate and it is necessary to lower the concentration of hydrocarbons to a concentration sufficiently low for making the produced reducing intermediate react with the active $NO_2^*$. That is, the concentration of hydrocarbons flowing into the exhaust purification catalyst 13 has to be made to vibrate within a predetermined range of amplitude. Note that, in this case, a sufficient amount of reducing intermediate R—NCO or R—$NH_2$ has to be held on the basic layer 53, that is, on the basic exhaust gas flow surface part 24, until the produced reducing intermediate reacts with the active $NO_2^*$. For this reason, the basic exhaust gas flow surface part 24 is provided.

On the other hand, if lengthening the feed period of the hydrocarbons, the time until the oxygen concentration becomes higher becomes longer in the period after the hydrocarbons are fed until the hydrocarbons are next fed. Therefore, the active $NO_2^*$ is absorbed in the basic layer 53 in the form of nitrates without producing a reducing intermediate. To avoid this, it is necessary to make the concentration of hydrocarbons flowing into the exhaust purification catalyst 13 vibrate by within a predetermined range of period.

Therefore, in an embodiment of the present invention, to make the $NO_x$ which is contained in the exhaust gas and the reformed hydrocarbons react and produce the reducing intermediate R—NCO or R—$NH_2$ containing nitrogen and hydrocarbons, the precious metal catalysts 51 and 52 are carried on the exhaust gas flow surface of the exhaust purification catalyst 13. To hold the produced reducing intermediate R—NCO or R—$NH_2$ inside the exhaust purification catalyst 13, the basic exhaust gas flow surface part 54 is formed around the precious metal catalysts 51 and 52. In the first $NO_x$ purification method according to the present invention, $NO_x$ is reduced by the reducing action of the reducing intermediate R—NCO or R—$NH_2$ held on basic exhaust gas flow surface part 54, and the vibration period of the hydrocarbon concentration is made the vibration period required for continuation of the production of the reducing intermediate R—NCO or R—$NH_2$. Incidentally, in the example shown in FIG. 11, the injection interval is made 3 seconds.

In this regard, when the second $NO_x$ purification method is used, as shown in FIG. 7, when the catalyst temperature TC becomes 400° C. or more, the $NO_x$ purification rate falls because if the catalyst temperature TC becomes 400° C. or more, the nitrates break down by heat and are released in the form of $NO_2$ from the exhaust purification catalyst 13. That is, so long as storing $NO_x$ in the form of nitrates, when the catalyst temperature TC is high, it is difficult to obtain a high $NO_x$ purification rate. However, in the first $NO_x$ purification method shown from FIG. 10 to FIGS. 13A and 13B, as will be understood from FIGS. 13A and 13B, nitrates are not formed or even if formed are extremely fine in amount, consequently, as shown in FIG. 12, even when the catalyst temperature TC is high, a high $NO_x$ purification rate is obtained.

That is, the first $NO_x$ purification method which is shown from FIG. 10 to FIGS. 13A and 13B can be said to be a new $NO_x$ purification method designed to remove $NO_x$ without forming almost any nitrates in the case of using an exhaust purification catalyst which carries a precious metal catalyst and forms a basic layer which can absorb $NO_x$. In actuality, when using this first $NO_x$ purification method, the nitrates which are detected from the basic layer 53 become much smaller in amount compared with the case where using the second $NO_x$ purification method.

Next, referring to FIG. 14 to FIG. 19, the first $NO_x$ purification method shown in FIG. 10 to FIGS. 13A and 13B will be explained in a bit more detail.

Figure 14:
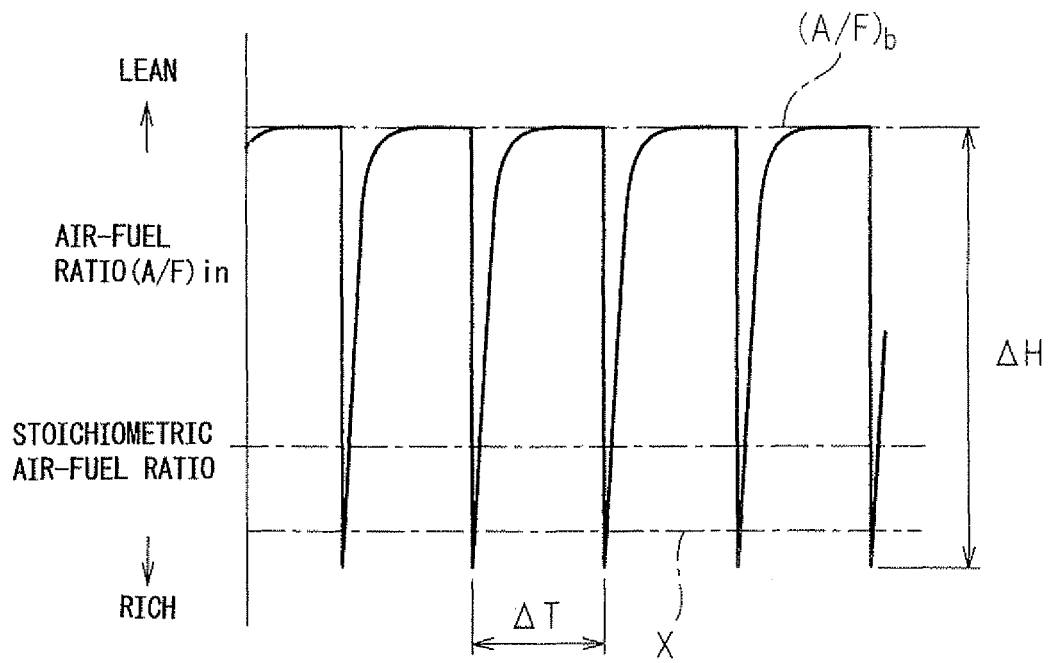
FIG. 14 is a time chart showing a change in an air-fuel ratio of exhaust gas flowing to an exhaust purification catalyst.

FIG. 14 shows enlarged the change in the air-fuel ratio (A/F)in shown in FIG. 11. Note that, as explained above, the change in the air-fuel ratio (A/F)in of the exhaust gas flowing into this exhaust purification catalyst 13 simultaneously shows the change in concentration of the hydrocarbons which flow into the exhaust purification catalyst 13. Note that, in FIG. 14, ΔH shows the amplitude of the change in concentration of hydrocarbons HC which flow into the exhaust purification catalyst 13, while ΔT shows the vibration period of the concentration of the hydrocarbons which flow into the exhaust purification catalyst 13.

Furthermore, in FIG. 14, (A/F)b shows the base air-fuel ratio which shows the air-fuel ratio of the combustion gas for generating the engine output. In other words, this base air-fuel ratio (A/F)b shows the air-fuel ratio of the exhaust gas which flows into the exhaust purification catalyst 13 when stopping the feed of hydrocarbons. On the other hand, in FIG. 14, X shows the upper limit of the air-fuel ratio (A/F)in which is used for producing the reducing intermediate without the produced active $NO_2^*$ being stored in the form of nitrates inside the basic layer 53. To make the active $NO_2^*$ and the reformed hydrocarbons react and produce the reducing intermediate, it is necessary to make the air-fuel ratio (A/F)in lower than the upper limit X of this air-fuel ratio.

In other words, in FIG. 14, X shows the lower limit of the concentration of hydrocarbons required for making the active $NO_2^*$ and reformed hydrocarbon react to produce a reducing intermediate. To produce the reducing intermediate, the concentration of hydrocarbons has to be made higher than this lower limit X. In this case, whether the reducing intermediate is produced is determined by the ratio of the oxygen concentration and hydrocarbon concentration around the active $NO_2^*$, that is, the air-fuel ratio (A/F)in. The upper limit X of the air-fuel ratio required for producing the reducing intermediate will below be called the demanded minimum air-fuel ratio.

In the example shown in FIG. 14, the demanded minimum air-fuel ratio X is rich, therefore, in this case, to form the reducing intermediate, the air-fuel ratio (A/F)in is instantaneously made the demanded minimum air-fuel ratio X or less, that is, rich. As opposed to this, in the example shown in FIG. 15, the demanded minimum air-fuel ratio X is lean. In this case, the air-fuel ratio (A/F)in is maintained lean while periodically reducing the air-fuel ratio (A/F)in so as to form the reducing intermediate.

In this case, whether the demanded minimum air-fuel ratio X becomes rich or becomes lean depends on the oxidizing strength of the exhaust purification catalyst 13. In this case, the exhaust purification catalyst 13, for example, becomes stronger in oxidizing strength if increasing the carried amount of the precious metal 51 and becomes stronger in oxidizing strength if strengthening the acidity. Therefore, the oxidizing strength of the exhaust purification catalyst 13 changes due to the carried amount of the precious metal 51 or the strength of the acidity.

Figure 15:
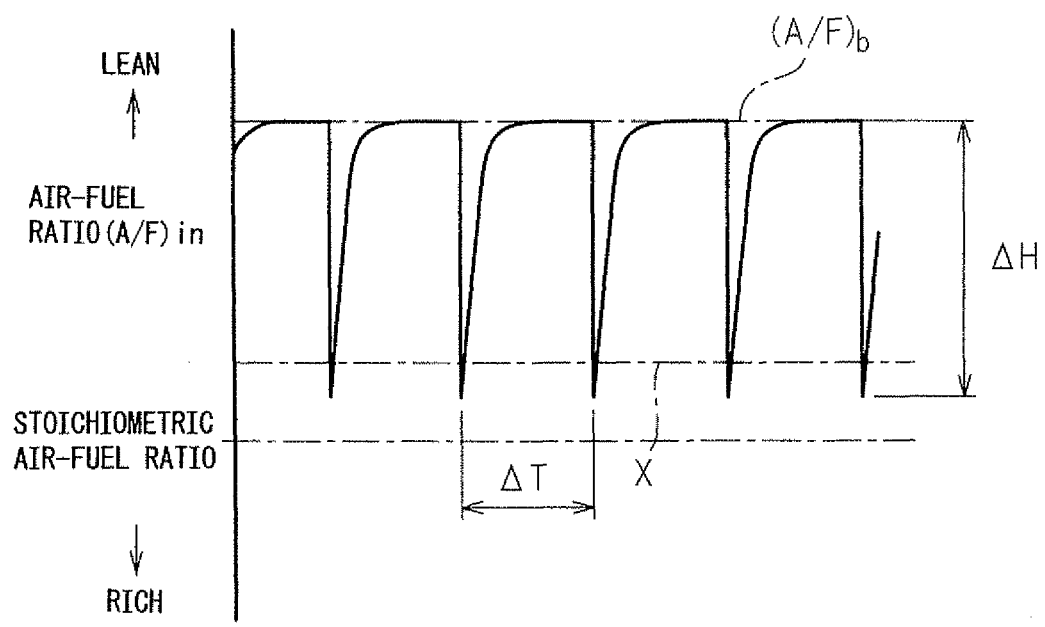
FIG. 15 is a time chart showing a change in an air-fuel ratio of exhaust gas flowing to an exhaust purification catalyst.

Now, if using an exhaust purification catalyst 13 with a strong oxidizing strength, as shown in FIG. 15, if maintaining the air-fuel ratio (A/F)in lean while periodically lowering the air-fuel ratio (A/F)in, the hydrocarbons end up becoming completely oxidized when the air-fuel ratio (A/F)in is reduced. As a result, the reducing intermediate can no longer be produced. As opposed to this, when using an exhaust purification catalyst 13 with a strong oxidizing strength, as shown in FIG. 14, if making the air-fuel ratio (A/F)in periodically rich, when the air-fuel ratio (A/F)in is made rich, the hydrocarbons will be partially oxidized, without being completely oxidized, that is, the hydrocarbons will be reformed, consequently the reducing intermediate will be produced. Therefore, when using an exhaust purification catalyst 13 with a strong oxidizing strength, the demanded minimum air-fuel ratio X has to be made rich.

On the other hand, when using an exhaust purification catalyst 13 with a weak oxidizing strength, as shown in FIG. 15, if maintaining the air-fuel ratio (A/F)in lean while periodically lowering the air-fuel ratio (A/F)in, the hydrocarbons will be partially oxidized without being completely oxidized, that is, the hydrocarbons will be reformed and consequently the reducing intermediate will be produced. As opposed to this, when using an exhaust purification catalyst 13 with a weak oxidizing strength, as shown in FIG. 14, if making the air-fuel ratio (A/F)in periodically rich, a large amount of hydrocarbons will be exhausted from the exhaust purification catalyst 13 without being oxidized and consequently the amount of hydrocarbons which is wastefully consumed will increase. Therefore, when using an exhaust purification catalyst 13 with a weak oxidizing strength, the demanded minimum air-fuel ratio X has to be made lean.

Figure 16:
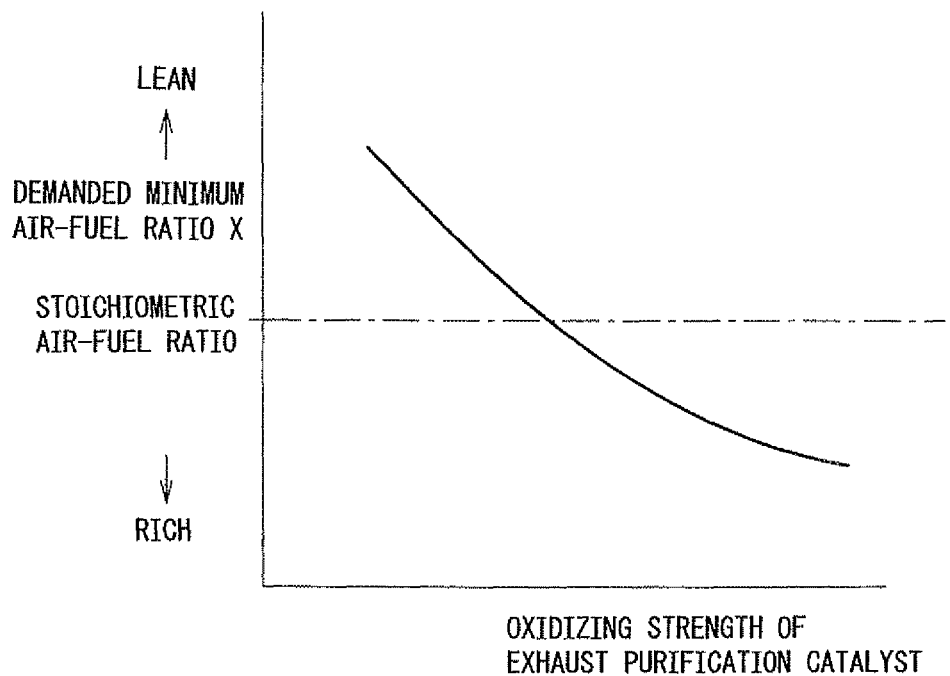
FIG. 16 is a view showing a relationship between an oxidizing strength of an exhaust purification catalyst and a demanded minimum air-fuel ratio X.

That is, it is learned that the demanded minimum air-fuel ratio X, as shown in FIG. 16, has to be reduced the stronger the oxidizing strength of the exhaust purification catalyst 13. In this way, the demanded minimum air-fuel ratio X becomes lean or rich due to the oxidizing strength of the exhaust purification catalyst 13. Below, taking as example the case where the demanded minimum air-fuel ratio X is rich, the amplitude of the change in concentration of hydrocarbons flowing into the exhaust purification catalyst 13 and the vibration period of the concentration of hydrocarbons flowing into the exhaust purification catalyst 13 will be explained.

Now, if the base air-fuel ratio (A/F)b becomes larger, that is, if the oxygen concentration in the exhaust gas before the hydrocarbons are fed becomes higher, the feed amount of hydrocarbons required for making the air-fuel ratio (A/F)in the demanded minimum air-fuel ratio X or less increases and along with this the excess amount of hydrocarbons which did not contribute the production of the reducing intermediate also increases. In this case, to remove the $NO_x$ well, as explained above, it is necessary to make the excess hydrocarbons oxidize. Therefore, to remove the $NO_x$ well, the larger the amount of excess hydrocarbons, the larger the amount of oxygen which is required.

In this case, if raising the oxygen concentration in the exhaust gas, the amount of oxygen can be increased. Therefore, to remove the $NO_x$ well, when the oxygen concentration in the exhaust gas before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration has to be made.

Figure 17:
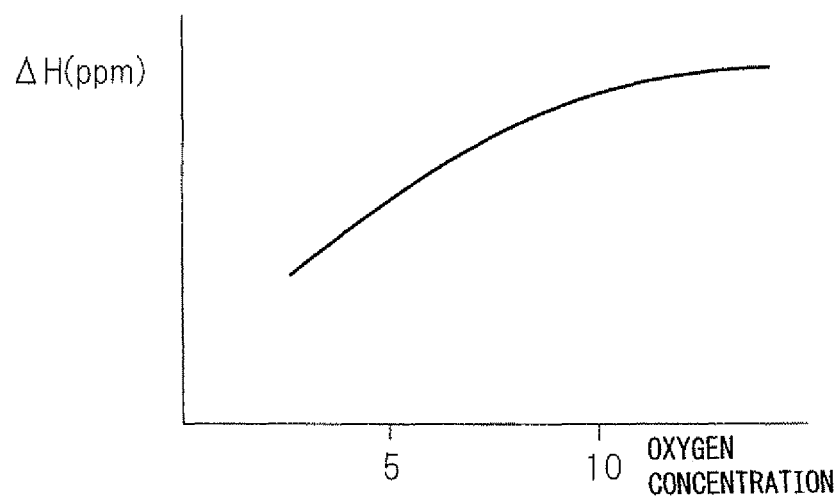
FIG. 17 is a view showing a relationship between an oxygen concentration in exhaust gas and an amplitude $\Delta H$ of a hydrocarbon concentration giving the same $NO_x$ purification rate.

FIG. 17 shows the relationship between the oxygen concentration in the exhaust gas before the hydrocarbons are fed and the amplitude ΔH of the hydrocarbon concentration when the same $NO_x$ purification rate is obtained. From FIG. 17, it is learned that to obtain the same $NO_x$ purification rate, the higher the oxygen concentration in the exhaust gas before the hydrocarbons are fed, the greater the amplitude ΔH of the hydrocarbon concentration has to be made. That is, to obtain the same $NO_x$ purification rate, the higher the base air-fuel ratio (A/F)b, the greater the amplitude ΔT of the hydrocarbon concentration has to be made. In other words, to remove the $NO_x$ well, the lower the base air-fuel ratio (A/F)b, the more the amplitude ΔT of the hydrocarbon concentration can be reduced.

Figure 18:
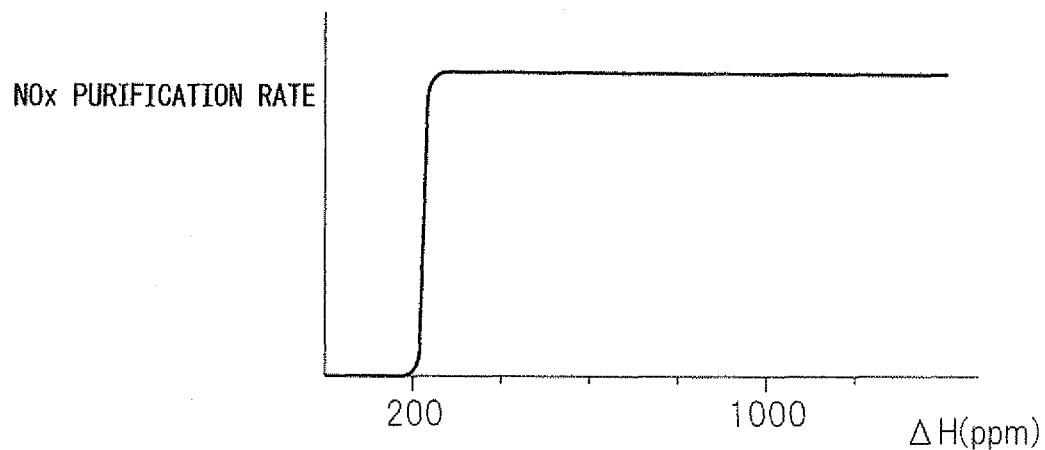
FIG. 18 is a view showing a relationship between an amplitude ΔH of a hydrocarbon concentration and an $NO_x$ purification rate.

In this regard, the base air-fuel ratio (A/F)b becomes the lowest at the time of an acceleration operation. At this time, if the amplitude ΔH of the hydrocarbon concentration is about 200 ppm, it is possible to remove the $NO_x$ well. The base air-fuel ratio (A/F)b is normally larger than the time of acceleration operation. Therefore, as shown in FIG. 18, if the amplitude ΔH of the hydrocarbon concentration is 200 ppm or more, an excellent $NO_x$ purification rate can be obtained.

On the other hand, it is learned that when the base air-fuel ratio (A/F)b is the highest, if making the amplitude ΔH of the hydrocarbon concentration 10000 ppm or so, an excellent $NO_x$ purification rate is obtained. Further, if the amplitude ΔH of the hydrocarbon concentration is over 10000 ppm, there is the danger that the air-fuel ratio (A/F)in will become rich. Therefore, there is the danger that the new $NO_x$ purification method can no longer be performed. Therefore, in the present invention, when performing the first NOx purification method, the predetermined range of the amplitude of the hydrocarbon concentration is made 200 ppm to 10000 ppm.

Figure 19:
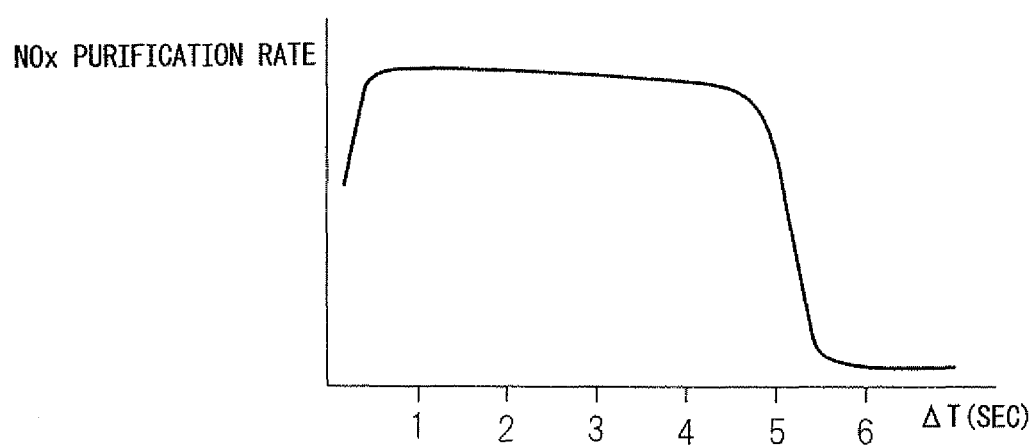
FIG. 19 is a view showing a relationship of a vibration period ΔT of a hydrocarbon concentration and an $NO_x$ purification rate.

Further, if the vibration period ΔT of the hydrocarbon concentration becomes longer, the oxygen concentration around the active $NO_2$* becomes higher in the time after the hydrocarbons are fed to when the hydrocarbons are next fed. In this case, if the vibration period ΔT of the hydrocarbon concentration becomes longer than about 5 seconds, the active $NO_2$* starts to be absorbed in the form of nitrates inside the basic layer 53. Therefore, as shown in FIG. 19, if the vibration period ΔT of the hydrocarbon concentration becomes long than about 5 seconds, the $NO_x$ purification rate will fall. Therefore, the vibration period ΔT of the hydrocarbon concentration has to be made 5 seconds or less.

On the other hand, if the vibration period ΔT of the hydrocarbon concentration becomes about 0.3 second or less, the fed hydrocarbons start to build up on the exhaust gas flow surface of the exhaust purification catalyst 13. Therefore, as shown in FIG. 19, if the vibration period ΔT of the hydrocarbon concentration becomes substantially 0.3 second or less, the $NO_x$ purification rate falls. Therefore, in the present invention, when performing the first $NO_x$ purification method, the vibration period of the hydrocarbon concentration is made from 0.3 second to 5 seconds.

Now, to use the first $NO_x$ purification method to remove the $NO_x$, even when the $NO_x$ concentration in the exhaust gas is low, it is necessary to feed a certain amount or more of hydrocarbons by a short period. Therefore, when the $NO_x$ concentration of the exhaust gas is low, the $NO_x$ purification efficiency becomes poorer. As opposed to this, in the second $NO_x$ purification method, when the $NO_x$ concentration in the exhaust gas is low, the time until the stored $NO_x$ amount ΣNOX reaches the allowable value MAX becomes longer, so the period by which the air-fuel ratio (A/F)in of the exhaust gas is made rich merely becomes longer. The $NO_x$ purification efficiency does not particularly become poor. Therefore, when the $NO_x$ concentration in the exhaust gas is low, it can be said to be preferable to use the second $NO_x$ purification method rather than the first $NO_x$ purification method.

Figure 9:
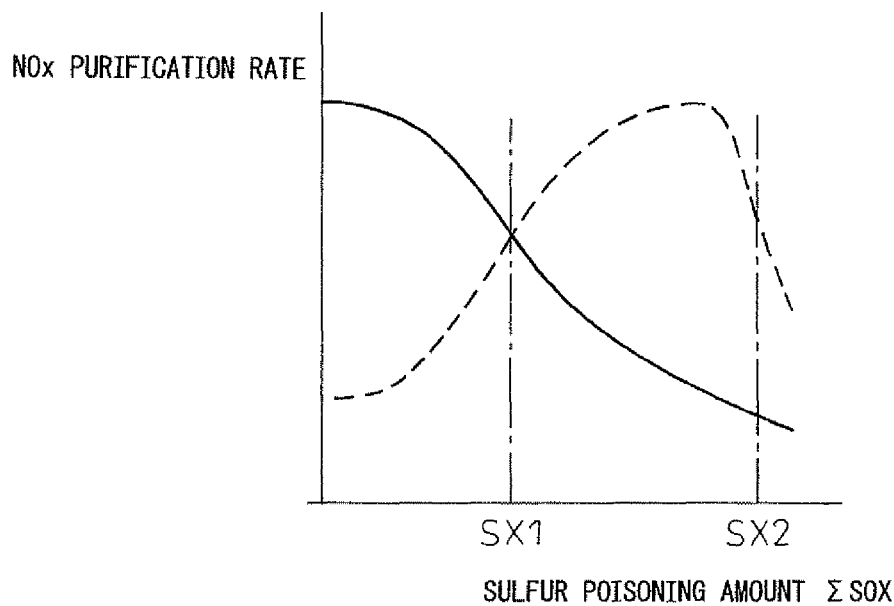
FIG. 9 is a view of an $NO_x$ purification rate.

The broken line of FIG. 9 shows the change in the $NO_x$ purification rate when the first $NO_x$ purification method is used. As will be understood from FIG. 9, the $NO_x$ purification rate by the first $NO_x$ purification method first increases along with an increase in the sulfur poisoning, then gradually declines. That is, if the sulfur poisoning increases, the oxidation function with respect to the hydrocarbons HC becomes stronger, so the $NO_x$ purification rate gradually increases.

However, if the sulfur poisoning further increases, the basicity of the basic layer 53 becomes weaker, so the holding force with regard to the reducing intermediate R—NCO or R—NH$_2$ becomes weaker and therefore the NO$_x$ purification rate gradually decreases.

Note that, in the case shown in FIG. 11, if making the feed period of the hydrocarbons HC longer than the predetermined feed period shown in FIG. 11, the hydrocarbons HC and the reducing intermediate R—NCO or R—NH$_2$ will disappear from the surface of the basic layer 53. At this time, the nitrate ions NO$_3^-$ formed on the platinum Pt 51 will, as shown in FIG. 3A, diffuse in the basic layer 53 and become nitrates. That is, at this time, the NO$_x$ in the exhaust gas is stored in the form of nitrates in the basic layer 53. Therefore, in this case, the NO$_x$ purification method becomes not the first NO$_x$ purification method, but the second NO$_x$ purification method.

Now, as will be understood from FIG. 9, to obtain a high NO$_x$ purification efficiency, it is preferable to selectively use the first NO$_x$ purification method and the second NO$_x$ purification method in accordance with the sulfur poisoning. Therefore, in the present invention, the first NO$_x$ purification method and the second NO$_x$ purification method are selectively used in accordance with the sulfur poisoning of the exhaust purification catalyst 13.

That is, explaining this in a bit more detail, in the present invention, the exhaust purification catalyst 13 has the property of storing the NO$_x$ which is contained in exhaust gas when the air-fuel ratio of the exhaust gas flowing into the exhaust purification catalyst 13 is lean and releasing the stored NO$_x$ when the air-fuel ratio of the inflowing exhaust gas becomes rich and has the property of reducing the NO$_x$ which is contained in exhaust gas if making the concentration of hydrocarbons flowing into the exhaust purification catalyst 13 vibrate within a predetermined range of amplitude and within a predetermined range of period when the sulfur poisoning of the exhaust purification catalyst 13 increases and, at the time of engine operation, a first NO$_x$ purification method which makes the concentration of hydrocarbons flowing into the exhaust purification catalyst vibrate by within a predetermined range of amplitude and within a predetermined range of period to thereby remove the NO$_x$ which is contained in exhaust gas and a second NO$_x$ purification method which switches the air-fuel ratio of the exhaust gas flowing into the exhaust purification catalyst from lean to rich by a period longer than the above predetermined range of period to thereby remove the NO$_x$ are selectively used in accordance with the sulfur poisoning of the exhaust purification catalyst 13.

In this case, to secure as high an NO$_x$ purification rate as possible regardless of the sulfur poisoning, in this embodiment according to the present invention, when use of the first NO$_x$ purification method would result in a higher NO$_x$ purification efficiency than use of the second NO$_x$ purification method, the first NO$_x$ purification method is used, while when use of the second NO$_x$ purification method would result in a higher NO$_x$ purification efficiency than use of the first NO$_x$ purification method, the second NO$_x$ purification method is used.

Note that, in actuality, as shown in FIG. 9, the sulfur poisoning SX1 for when the NO$_x$ purification rate when using the first NO$_x$ purification method and the NO$_x$ purification rate when using the second NO$_x$ purification method become equal is found in advance by experiments. This sulfur poisoning SX1 is used as a reference amount for switching of the NO$_x$ purification method. That is, when the sulfur poisoning of the exhaust purification catalyst 13 is less than a predetermined reference amount SX1, the second NO$_x$ purification method is used, while when the sulfur poisoning of the exhaust purification catalyst 13 exceeds the predetermined reference amount SX1, the first NO$_x$ purification method is used.

On the other hand, if the sulfur poisoning exceeds the reference amount SX1 and the first NO$_x$ purification method is used, as shown by the broken line in FIG. 9, first, the NO$_x$ purification rate increases as the sulfur poisoning increases. When the sulfur poisoning further increases, the NO$_x$ purification rate falls. When the NO$_x$ purification rate falls in this way, in so far as the sulfur poisoning is not reversed, it will no longer be possible to raise the NO$_x$ purification rate. Therefore, in this embodiment according to the present invention, if the sulfur poisoning of the exhaust purification catalyst 13 reaches a predetermined limit amount SX2 larger than the reference amount SX1, sulfur poisoning recovery processing is performed.

In this case, if the temperature of the exhaust purification catalyst 13 is made to rise to a 600° C. or higher SO$_x$ release temperature and, in that state, the air-fuel ratio of the exhaust gas flowing into the exhaust purification catalyst 13 is made rich, it is possible to make the exhaust purification catalyst 13 release the SO$_x$. Therefore, in this embodiment according to the present invention, the temperature of the exhaust purification catalyst 13 is made to rise to a 600° C. or higher SO$_x$ release temperature and, in that state, the air-fuel ratio of the exhaust gas flowing into the exhaust purification catalyst 13 is made rich so as to perform SO$_x$ poisoning recovery processing.

Figure 20:
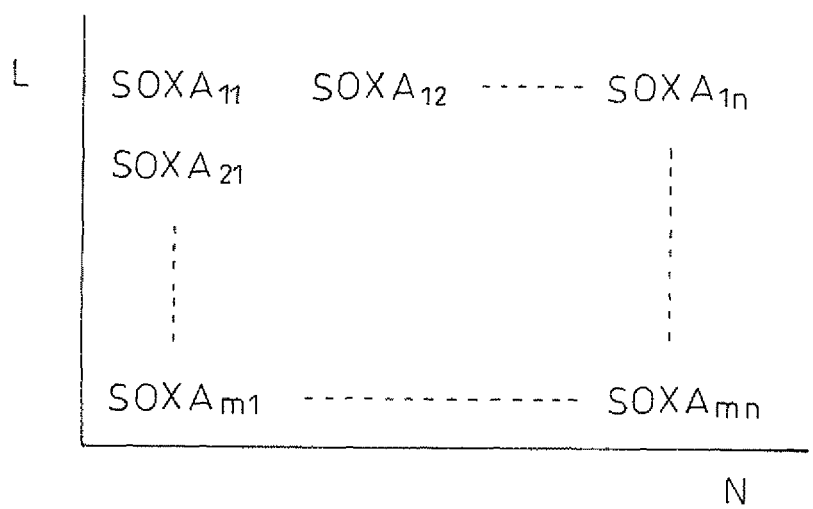
FIG. 20 is a view showing a map of an exhausted $SO_x$ amount SOXA.

The sulfur poisoning of the exhaust purification catalyst 13 can be represented by the amount of SO$_x$ stored in the exhaust purification catalyst 13. The SO$_x$ amount which is stored in the exhaust purification catalyst 13 can be found by cumulatively adding the amounts of SO$_x$ which are exhausted from the engine. Therefore, in this embodiment according to the present invention, the exhausted SO$_x$ amount SOXA exhausted from the engine per unit time is stored as a function of the engine load L and the engine speed N in the form of a map such as shown in FIG. 20 in advance in the ROM 32. The stored SO$_x$ amount ΣSOX representing the sulfur poisoning is calculated from this exhausted SO$_x$ amount SOXA.

Figure 21:
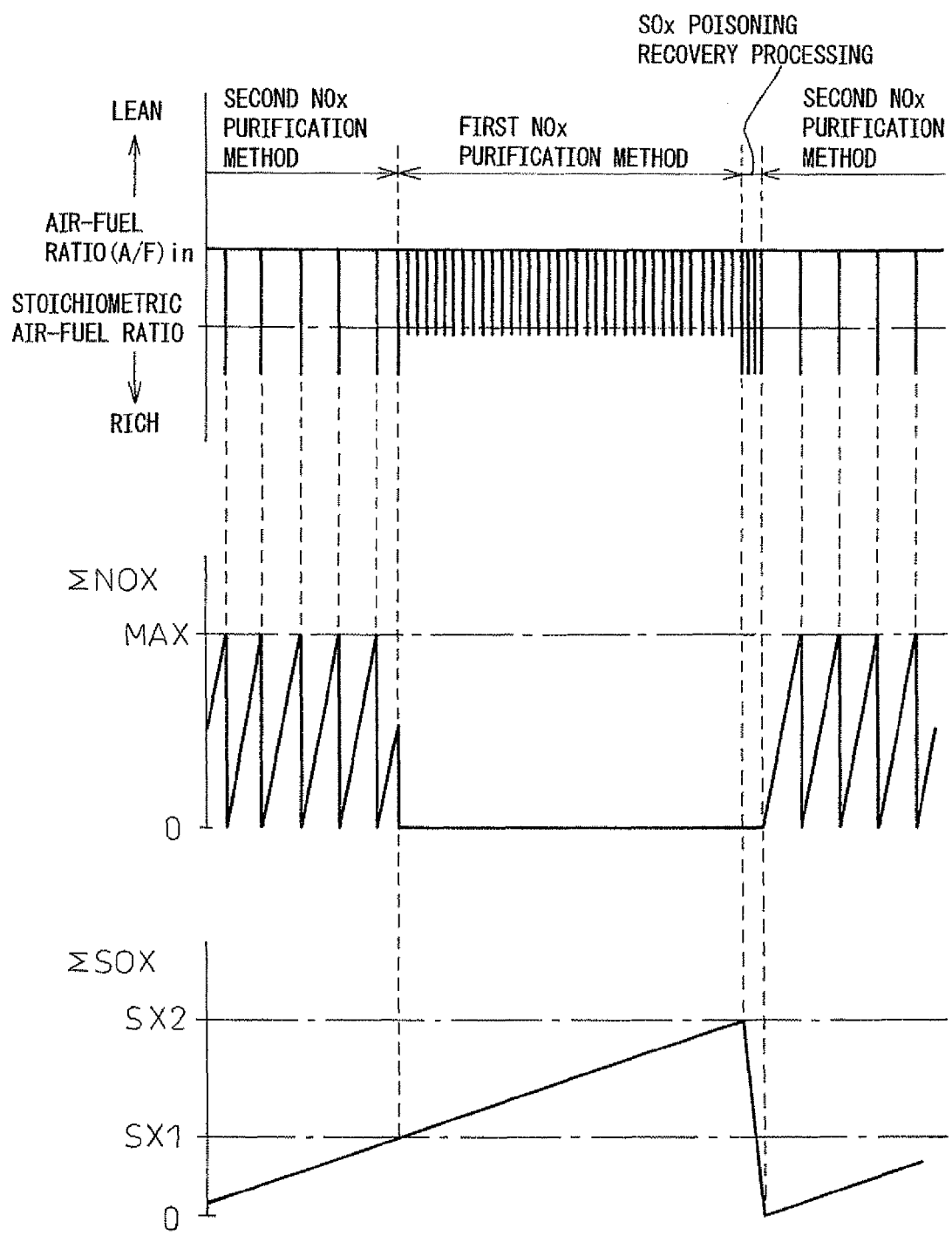
FIG. 21 is a time chart showing a change in an air-fuel ratio (A/F)in of exhaust gas etc. when an exhaust purification method according to the present invention is being performed.

FIG. 21 shows one example of an exhaust purification method according to the present invention. Note that, FIG. 21 shows the change of the air-fuel ratio (A/F) in of the exhaust gas flowing into the exhaust purification catalyst 13, the change of the stored NO$_x$ amount ΣNOX stored in the exhaust purification catalyst 13, and the change of the stored SO$_x$ amount ΣSOX stored in the exhaust purification catalyst 13.

As shown in FIG. 21, when the stored SO$_x$ amount ΣSOX representing the sulfur poisoning is lower than a reference amount SX1, the second NO$_x$ purification method is used for the NO$_x$ purification action. That is, at this time, each time the stored NO$_x$ amount ΣNOX of the exhaust purification catalyst 13 exceeds the allowable value MAX, the air-fuel ratio (A/F) in of the exhaust gas flowing into the exhaust purification catalyst 13 is made rich. Next, if the stored SO$_x$ amount ΣSOX exceeds the reference amount SX1, the NO$_x$ purification method is switched from the second NO$_x$ purification method to the first NO$_x$ purification method. Therefore, at this time, hydrocarbons are injected from the hydrocarbon feed valve 15 by the predetermined period.

Next, when the stored SO$_x$ amount ΣSOX reaches the limit amount SX2, SO$_x$ poisoning recovery processing is performed. That is, the temperature of the exhaust purification catalyst 13 is made to rise to a 600° C. or higher SO$_x$ release temperature and, in that state, the air-fuel ratio (A/F) in of the exhaust gas flowing into the exhaust purification catalyst 13 is made rich for a short interval. Next, when the $SO_x$ poisoning recovery processing is completed, an $NO_x$ purification action by the second $NO_x$ purification method is again started.

Note that, when the second $NO_x$ purification method is switched to the first $NO_x$ purification method, if stored $NO_x$ remains in the exhaust purification catalyst 13, there is the danger that when the feed of hydrocarbons causes the temperature TC of the exhaust purification catalyst 13 to rise, the stored $NO_x$ will be discharged from the $NO_x$ purification catalyst 13. However, when the $NO_x$ purification action by the first $NO_x$ purification method is being performed, there is no reducing action on the thus discharged $NO_x$ and therefore the $NO_x$ is exhausted into the atmosphere.

However, if making the air-fuel ratio (A/F) in of the exhaust gas a certain rich degree or higher rich level, it is possible to reduce the stored $NO_x$ which remains at the exhaust purification catalyst 13 and therefore possible to prevent $NO_x$ from being exhausted into the atmosphere. Therefore, in this embodiment according to the present invention, as shown in FIG. 21, when switched from the second $NO_x$ purification method to first $NO_x$ purification method, the air-fuel ratio of the exhaust gas flowing into the exhaust purification catalyst 13 is temporarily made a certain rich degree or higher rich level to release and reduce the $NO_x$ which is stored in the exhaust purification catalyst 13.

Figure 22:
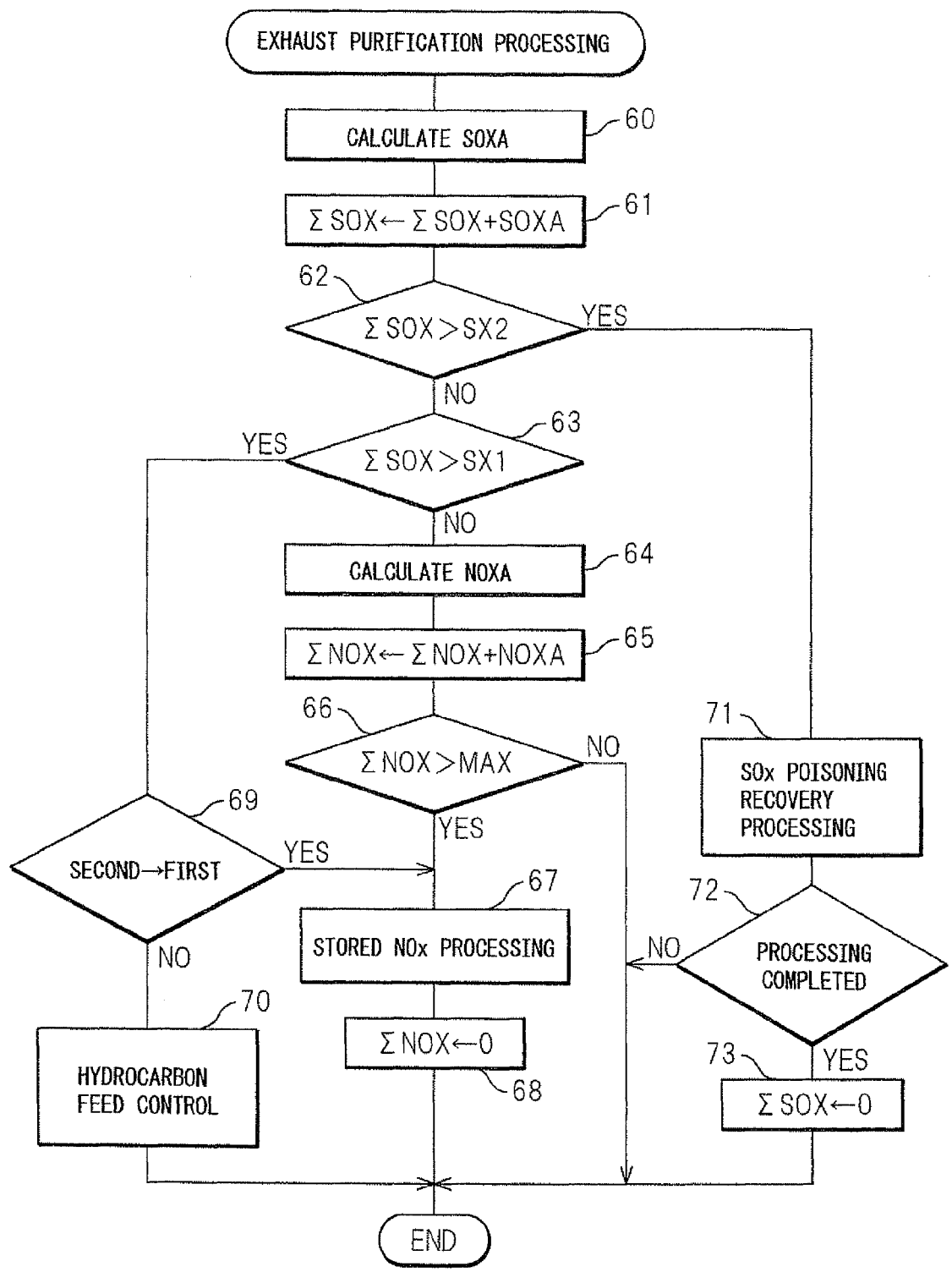
FIG. 22 is a flow chart for exhaust purification processing.

FIG. 22 shows a processing routine for exhaust purification for working the embodiment shown in FIG. 21. This routine is executed by interruption every predetermined time.

Referring to FIG. 22, first, at step 60, the $SO_x$ amount SOXA exhausted per unit time is calculated from the map shown in FIG. 20. Next, at step 61, this exhausted $SO_x$ amount SOXA is added to ΣSOX to calculate the stored $SO_x$ amount ΣSOX stored in the exhaust purification catalyst 13. Next, at step 62, it is judged if the stored $SO_x$ amount ΣSOX exceeds the limit amount SX2. When ΣSOX≤SX2, the routine proceeds to step 63 where it is judged if the stored $SO_x$ amount ΣSOX exceeds the reference amount SX1. When ΣSOX≤SX1, the routine proceeds to step 64.

At step 64, the $NO_x$ amount NOXA exhausted per unit time is calculated from the map shown in FIG. 5. Next, at step 65, this exhausted $NO_x$ amount NOXA is added to ΣNOX so as to calculate the stored $NO_x$ amount ΣNOX which is stored in the exhaust purification catalyst 13. Next, at step 66, it is judged if the stored $NO_x$ amount ΣNOX exceeds the allowable value MAX. When ΣNOX>MAX, the routine proceeds to step 67 where the air-fuel ratio (A/F) in of the exhaust gas flowing into the exhaust purification catalyst 13 is made temporarily a certain rich degree or higher rich level. Next, at step 68, ΣNOX is cleared.

On the other hand, when it is judged at step 63 that ΣSOX>SX1, the routine proceeds to step 69 where it is judged if the $NO_x$ purification method has now been switched from the second $NO_x$ purification method to the first $NO_x$ purification method. When the $NO_x$ purification method has now been switched from the second $NO_x$ purification method to the first $NO_x$ purification method, the routine proceeds to step 67 where the air-fuel ratio (A/F) in of the exhaust gas flowing into the exhaust purification catalyst 13 is made temporarily a certain rich degree or higher rich level. As opposed to this, when the $NO_x$ purification method has not now been switched from the second $NO_x$ purification method to the first $NO_x$ purification method, the routine proceeds to step 70 where hydrocarbons are injected from the hydrocarbon feed valve 15 by the predetermined period.

On the other hand, when it is judged at step 62 that ΣSOX>SX2, the routine proceeds to step 71 where $SO_x$ poisoning recovery processing is performed. That is, the temperature of the exhaust purification catalyst 13 is made to rise to a 600° C. or higher $SO_x$ release temperature and, in that state, the air-fuel ratio (A/F) in of the exhaust gas flowing into the exhaust purification catalyst 13 is made rich for a short interval. Next, at step 72, it is judged if the $SO_x$ poisoning recovery processing is completed. When the $SO_x$ poisoning recovery processing is completed, the routine proceeds to step 73 where ΣSOX is cleared.

Figure 23A:
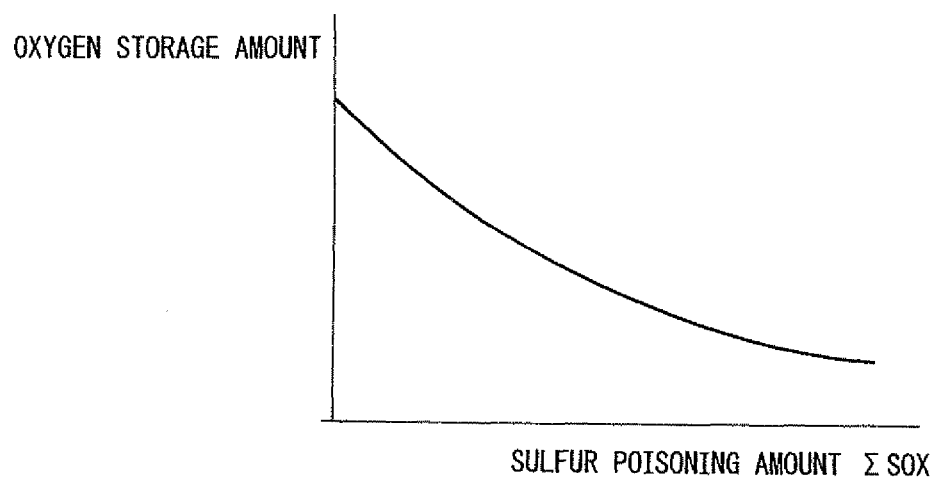
FIGS. 23A and 23B are views for explaining an amount of feed of hydrocarbons at the time of $SO_x$ poisoning.

In this regard, when the exhaust purification catalyst 13 has an oxygen storage ability, for example, when it contains cerium Ce, if sulfur poisoning progresses, the ceria $CeO_2$ is changed to the sulfate $CeSO_4$. Therefore, in this case, as shown in FIG. 23A, the greater the sulfur poisoning, that is, the greater the stored $SO_x$ amount ΣSOX, the more the oxygen storage amount of the exhaust purification catalyst 13 is decreased.

Figure 23B:
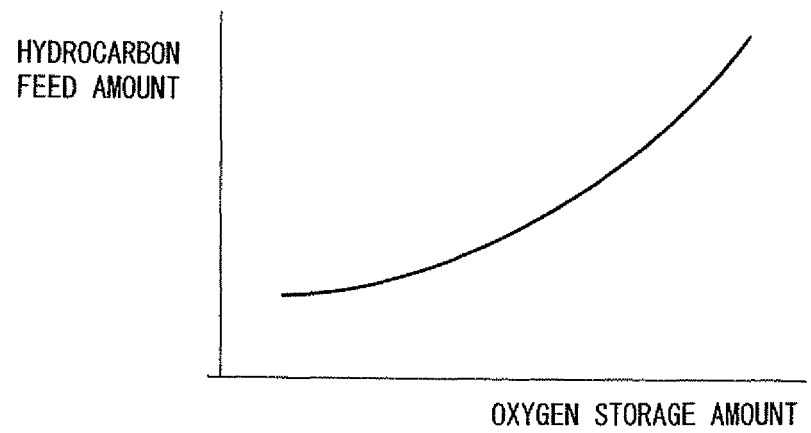

On the other hand, since the first $NO_x$ purification method is used to remove the $NO_x$, if hydrocarbons are fed from the hydrocarbon feed valve 15, part of the hydrocarbons will be oxidized by the oxygen which is stored in the exhaust purification catalyst 13. In other words, part of the fed hydrocarbons will be used for consuming the stored oxygen. On the other hand, to remove the $NO_x$, a certain amount of hydrocarbons is required. Therefore, as shown in FIG. 23B, the smaller the oxygen storage amount, that is, the greater the sulfur poisoning, the more the amount of feed of hydrocarbons can be decreased.

Therefore, in one embodiment of the present invention, when the amount of oxygen which is stored in the exhaust purification catalyst 13 is reduced, when the first $NO_x$ purification method is being used, the amount of hydrocarbons which is injected from the hydrocarbon feed valve 15 is made to fall.

Note that, as another embodiment, in the engine exhaust passage upstream of the exhaust purification catalyst 13, an oxidation catalyst for modifying the hydrocarbons can be arranged.

REFERENCE SIGNS LIST

4 . . . intake manifold
5 . . . exhaust manifold
7 . . . exhaust turbocharger
12 . . . exhaust pipe
13 . . . exhaust purification catalyst
15 . . . hydrocarbon feed valve

The invention claimed is:

1. An exhaust purification system of an internal combustion engine, the exhaust purification system comprising:
an engine exhaust passage;
an exhaust purification catalyst for reacting $NO_x$ contained in exhaust gas and reformed hydrocarbons arranged in the engine exhaust passage, wherein
precious metal catalysts are carried and a basic layer is formed on the exhaust purification catalyst;
an electronic control unit, wherein the electronic control unit is configured to control a vibration of a concentration of hydrocarbons flowing into the exhaust purification catalyst within a predetermined range of amplitude and within a predetermined range of period, and is configured to control the vibration of the concentration of hydrocarbons for a period longer than the predetermined range of period, wherein
when the electronic control unit controls the vibration of the concentration of hydrocarbons within the predetermined range of amplitude and within the predetermined range of period, a reducing intermediate containing nitrogen and hydrocarbons is produced on the precious metal catalysts and held on the basic layer, the $NO_x$ contained in the exhaust gas is chemically reduced by the reducing intermediate held on the basic layer in the exhaust purification catalyst, and the exhaust purification catalyst has a property of chemically reducing the $NO_x$ that is contained in the exhaust gas without storing, or storing a fine amount of nitrates in the basic layer, and when the electronic control unit controls the vibration of the concentration of hydrocarbons for a period longer than the predetermined range of period, the exhaust purification catalyst has a property of storing the $NO_x$ that is contained in the exhaust gas when an air-fuel ratio of the exhaust gas flowing into the exhaust purification catalyst is lean and releasing the stored $NO_x$ when the air-fuel ratio of the inflowing exhaust gas becomes rich, and the electronic control unit is configured to selectively control the vibration of the concentration of the hydrocarbons flowing into the exhaust purification catalyst in accordance with a sulfur poisoning of the exhaust purification catalyst.

2. The exhaust purification system of an internal combustion engine as claimed in claim 1, wherein the predetermined range of period of vibration of the concentration of hydrocarbons is the predetermined range of period of vibration necessary for continuing to produce the reducing intermediate.

3. The exhaust purification system of an internal combustion engine as claimed in claim 1, wherein the precious metal catalysts are comprised of platinum Pt and at least one of rhodium Rh and palladium Pd.

4. The exhaust purification system of an internal combustion engine as claimed in claim 1, wherein the basic layer includes an alkali metal, alkali earth metal, rare earth, or metal that donates electrons to $NO_x$.

5. The exhaust purification system of an internal combustion engine as claimed in claim 1, wherein the exhaust purification catalyst has an oxygen storage ability and, when an amount of oxygen that is stored at the exhaust purification catalyst is decreased, an amount of hydrocarbons fed when the electronic control unit controls the vibration of the concentration of hydrocarbons flowing into the exhaust purification catalyst within the predetermined range of amplitude and within the predetermined range of period is decreased.

6. The exhaust purification system of an internal combustion engine as claimed in claim 1, wherein, when the electronic control unit controls the vibration of the concentration of hydrocarbons for the period longer than the predetermined range of period, when the air-fuel ratio of the exhaust gas flowing into the exhaust purification catalyst is lean, the $NO_x$ in the exhaust gas is stored in the basic layer, while when the air-fuel ratio of the exhaust gas flowing into the exhaust purification catalyst becomes rich, the stored $NO_x$ is released from the basic layer and chemically reduced.

7. The exhaust purification system of an internal combustion engine as claimed in claim 1, wherein when the electronic control unit controls the vibration of the concentration of hydrocarbons within the predetermined range of amplitude and within the predetermined range of period, and when the electronic control unit controls the vibration of the concentration of hydrocarbons for a period longer than the predetermined range of period, $SO_x$ is stored in the exhaust purification catalyst.

8. The exhaust purification system of an internal combustion engine as claimed in claim 1, wherein when the electronic control unit switches from the controlling of the vibration of the concentration of hydrocarbons for the period longer than the predetermined range of period to controlling the vibration of the concentration of hydrocarbons within the predetermined range of amplitude and within the predetermined range of period, the air-fuel ratio of the exhaust gas flowing into the exhaust purification catalyst is made temporarily rich to release and chemically reduce the $NO_x$ stored in the exhaust purification catalyst.

9. The exhaust purification system of an internal combustion engine as claimed in claim 8, wherein the predetermined range of period of vibration of the concentration of hydrocarbons is 0.3 seconds to 5 seconds.

10. The exhaust purification system of an internal combustion engine as claimed in claim 1, wherein when controlling the vibration of the concentration of hydrocarbons flowing into the exhaust purification catalyst within the predetermined range of amplitude and within the predetermined range of period would give a higher $NO_x$ purification efficiency than the controlling of the vibration of the concentration of hydrocarbons for the period longer than the predetermined range of period, the electronic control unit controls the vibration of the concentration of hydrocarbons within the predetermined range of amplitude and within the predetermined range of period, or when the controlling of the vibration of the concentration of hydrocarbons for the period longer than the predetermined range of period would give a higher $NO_x$ purification efficiency than the controlling of the vibration of the concentration of hydrocarbons flowing into the exhaust purification catalyst within the predetermined range of amplitude and within the predetermined range of period, the electronic control unit controls the vibration of the concentration of hydrocarbons for the period longer than the predetermined range of period.

11. The exhaust purification system of an internal combustion engine as claimed in claim 10, wherein when sulfur poisoning of the exhaust purification catalyst is smaller than a predetermined reference amount, the electronic control unit controls the vibration of the concentration of hydrocarbons for the period longer than the predetermined range of period, or when sulfur poisoning of the exhaust purification catalyst exceeds the predetermined reference amount, the electronic control unit controls the vibration of the concentration of hydrocarbons within the predetermined range of amplitude and within the predetermined range of period.

12. The exhaust purification system of an internal combustion engine as claimed in claim 11, wherein the electronic control unit is further configured to perform a recovery processing of the sulfur poisoning when the sulfur poisoning of the exhaust purification catalyst reaches a predetermined limit amount greater than the reference amount.

* * * * *